United States Patent
Deshpande et al.

(10) Patent No.: US 11,654,385 B2
(45) Date of Patent: May 23, 2023

(54) UTILIZING A MECHANICAL SEAL BETWEEN A FILTER MEDIA AND AN ENDCAP OF A ROTATING FILTER CARTRIDGE

(71) Applicant: Cummins Filtration IP, Inc., Columbus, IN (US)

(72) Inventors: Himani Deshpande, Fitchburg, WI (US); Christopher E. Holm, Madison, WI (US); Anthony Barreteau, Quimper (FR); Chirag D Parikh, Madison, WI (US); Gérard Malgorn, Quimper (FR); Alain Olier, Pluguffan (FR); Bradley A Smith, Columbus, IN (US); Benjamin L Scheckel, Stoughton, WI (US); Lee A. Peck, Stoughton, WI (US); Brian W. Schwandt, Fort Atkinson, WI (US); Ken Tofsland, Stoughton, WI (US)

(73) Assignee: CUMMINS FILTRATION IP, INC, Columbus, IN (US)

(*) Notice: Subject to any disclaimer, the term of this patent is extended or adjusted under 35 U.S.C. 154(b) by 619 days.

(21) Appl. No.: 15/761,704

(22) PCT Filed: Sep. 20, 2016

(86) PCT No.: PCT/US2016/052600
§ 371 (c)(1),
(2) Date: Mar. 20, 2018

(87) PCT Pub. No.: WO2017/053267
PCT Pub. Date: Mar. 30, 2017

(65) Prior Publication Data
US 2019/0046911 A1    Feb. 14, 2019

Related U.S. Application Data

(60) Provisional application No. 62/232,073, filed on Sep. 24, 2015.

(51) Int. Cl.
*B01D 46/00* (2022.01)
*F01M 13/04* (2006.01)
(Continued)

(52) U.S. Cl.
CPC ..... *B01D 46/0031* (2013.01); *B01D 46/0001* (2013.01); *B01D 46/003* (2013.01);
(Continued)

(58) Field of Classification Search
None
See application file for complete search history.

(56) References Cited

U.S. PATENT DOCUMENTS

| 2,181,608 A | * | 11/1939 | Russell | ............ C10M 175/0008 |
| | | | | 210/283 |
| 2,701,062 A | * | 2/1955 | John | ...................... B01D 39/06 |
| | | | | 210/458 |

(Continued)

FOREIGN PATENT DOCUMENTS

| DE | 3332324 A1 | * | 3/1984 | ............ B01D 39/14 |
| DE | 20100363 U1 | | 12/2001 | |

(Continued)

OTHER PUBLICATIONS

Billiet, DE 3332324 Espacenet Translation, 1984, Espacenet, All pages (Year: 1984).*

(Continued)

*Primary Examiner* — Christopher P Jones
*Assistant Examiner* — Brit E. Anbacht
(74) *Attorney, Agent, or Firm* — Foley & Lardner LLP

(57) ABSTRACT

Referring to the figures generally, a rotating filter cartridge includes a first endcap, a second endcap, and a filter media. The filter media is positioned between the first endcap and the second endcap. The filter media creates a mechanical seal between at least one of the first endcap or the second (Continued)

endcap during rotation of the rotating filter cartridge without the use of a potting material. In at least one embodiment, the rotating filter cartridge further includes a body secured to the first endcap and the second endcap. At least one of the first endcap or the second endcap, and the body, may form a pocket that radially pinches the filter media to form the mechanical seal.

20 Claims, 27 Drawing Sheets

(51) Int. Cl.
  *B01D 46/26* (2006.01)
  *B01D 46/24* (2006.01)
(52) U.S. Cl.
  CPC ...... *B01D 46/0056* (2013.01); *B01D 46/2411* (2013.01); *B01D 46/2414* (2013.01); *B01D 46/26* (2013.01); *F01M 13/04* (2013.01); *B01D 2201/0415* (2013.01); *B01D 2201/127* (2013.01); *B01D 2201/291* (2013.01); *B01D 2201/4084* (2013.01); *B01D 2265/027* (2013.01); *B01D 2265/06* (2013.01); *F01M 2013/0422* (2013.01); *F01M 2013/0438* (2013.01)

(56) References Cited

U.S. PATENT DOCUMENTS

| | | | | |
|---|---|---|---|---|
| 2,770,426 | A * | 11/1956 | Sievers | B01D 29/15 242/118.8 |
| 3,127,255 | A * | 3/1964 | Winslow | B01D 35/06 96/178 |
| 3,467,256 | A * | 9/1969 | Humbert, Jr. | B01D 27/106 210/132 |
| 3,469,706 | A * | 9/1969 | Kissell | B01D 35/02 210/448 |
| 3,708,957 | A * | 1/1973 | Labadie | F02M 25/06 95/277 |
| 3,985,657 | A * | 10/1976 | Coughlan | B01D 27/02 210/440 |
| 4,009,715 | A | 3/1977 | Forberg et al. | |
| 5,173,186 | A * | 12/1992 | Spafford | B01D 29/52 210/455 |
| 5,290,445 | A * | 3/1994 | Buttery | B01D 27/08 156/218 |
| 5,643,467 | A * | 7/1997 | Romanco | B01D 29/15 210/767 |
| 5,660,729 | A | 8/1997 | Baumann | |
| 5,736,040 | A | 4/1998 | Duerrstein et al. | |
| 5,792,351 | A | 8/1998 | Wehrle et al. | |
| 5,853,577 | A | 12/1998 | Gizowski et al. | |
| 6,017,300 | A | 1/2000 | Herman | |
| 6,051,144 | A | 4/2000 | Clack et al. | |
| 6,086,763 | A | 7/2000 | Baumann | |
| 6,095,964 | A | 8/2000 | Purvey | |
| 6,146,527 | A | 11/2000 | Oelschlaegel | |
| 6,152,120 | A * | 11/2000 | Julazadeh | F01M 13/04 123/572 |
| 6,224,531 | B1 | 5/2001 | Frehland et al. | |
| 6,299,772 | B1 | 10/2001 | Huschke et al. | |
| 6,424,067 | B1 | 7/2002 | Samways | |
| 6,530,872 | B2 | 3/2003 | Frehland et al. | |
| 6,536,600 | B1 * | 3/2003 | Nieuwland | F01M 11/03 210/352 |
| 6,607,665 | B2 * | 8/2003 | Fick | B01D 29/111 210/238 |
| 6,620,090 | B2 | 9/2003 | Fischer et al. | |
| 6,973,925 | B2 | 12/2005 | Sauter et al. | |
| 6,974,408 | B2 | 12/2005 | Grosse-Wiesmann | |
| 7,077,881 | B2 | 7/2006 | Franzen et al. | |
| 7,081,146 | B2 | 7/2006 | Hallgren et al. | |
| 7,090,634 | B2 | 8/2006 | Mackel et al. | |
| 7,122,123 | B2 * | 10/2006 | Carew | A01K 63/045 210/767 |
| 7,235,177 | B2 | 6/2007 | Herman et al. | |
| 7,250,066 | B2 | 7/2007 | Seipler | |
| 7,297,098 | B2 | 11/2007 | Fell | |
| 7,300,396 | B2 | 11/2007 | Pitkamaki et al. | |
| 7,338,546 | B2 | 3/2008 | Eliasson et al. | |
| 7,396,373 | B2 | 7/2008 | Lagerstedt et al. | |
| 7,428,898 | B2 * | 9/2008 | Roberts | B01D 19/0042 123/573 |
| 7,445,653 | B2 | 11/2008 | Trautmann et al. | |
| 7,662,220 | B2 | 2/2010 | Fukano et al. | |
| 7,713,185 | B2 | 5/2010 | Baumann et al. | |
| 7,799,109 | B2 | 9/2010 | Dunsch et al. | |
| 7,811,347 | B2 | 10/2010 | Carlsson et al. | |
| 7,824,458 | B2 | 11/2010 | Borgstrom et al. | |
| 7,824,459 | B2 | 11/2010 | Borgstrom et al. | |
| 7,959,547 | B2 | 6/2011 | Baumann et al. | |
| 8,002,690 | B2 | 8/2011 | Wiesmann et al. | |
| 8,172,917 | B2 | 5/2012 | Kup et al. | |
| 8,177,874 | B2 | 5/2012 | Bittle et al. | |
| 8,182,408 | B2 | 5/2012 | Isaksson et al. | |
| 8,376,924 | B2 | 2/2013 | Burford et al. | |
| 8,404,029 | B2 | 3/2013 | Lundgren et al. | |
| 8,540,613 | B2 | 9/2013 | Burford et al. | |
| 8,632,676 | B2 | 1/2014 | Formica | |
| 8,794,222 | B2 * | 8/2014 | Schwandt | F01M 13/04 123/573 |
| 9,186,686 | B2 | 11/2015 | Mackel et al. | |
| 9,194,265 | B2 * | 11/2015 | Parikh | F02D 23/00 |
| 9,233,325 | B2 | 1/2016 | Carlsson et al. | |
| 9,346,002 | B2 | 5/2016 | Kleynen | |
| 9,422,738 | B2 | 8/2016 | Hegi | |
| 9,427,747 | B2 | 8/2016 | Karlsson | |
| 9,474,993 | B2 | 10/2016 | Fell et al. | |
| 9,714,591 | B2 | 7/2017 | Szepessy | |
| 10,195,551 | B2 | 2/2019 | Piva et al. | |
| 2002/0088445 | A1 | 7/2002 | Weindorf et al. | |
| 2004/0154977 | A1 * | 8/2004 | Wells | B01D 29/111 210/457 |
| 2005/0120685 | A1 | 6/2005 | Fischer et al. | |
| 2006/0090651 | A1 | 5/2006 | Liu et al. | |
| 2006/0091061 | A1 | 5/2006 | Brown | |
| 2007/0114170 | A1 | 5/2007 | Krull et al. | |
| 2007/0215561 | A1 | 9/2007 | Yates et al. | |
| 2009/0145095 | A1 | 6/2009 | Juliar et al. | |
| 2009/0294351 | A1 * | 12/2009 | Herman | B01D 35/30 210/457 |
| 2010/0126126 | A1 | 5/2010 | Cheng | |
| 2010/0146917 | A1 | 6/2010 | Coulonvaux et al. | |
| 2011/0180051 | A1 * | 7/2011 | Schwandt | F01M 13/04 123/573 |
| 2011/0247309 | A1 * | 10/2011 | Smith | B04B 7/12 55/447 |
| 2011/0252974 | A1 * | 10/2011 | Verdegan | F01M 13/04 96/178 |
| 2011/0281712 | A1 | 11/2011 | Schlamann et al. | |
| 2012/0055126 | A1 * | 3/2012 | Whittier | B01D 53/0431 55/482 |
| 2013/0032521 | A1 * | 2/2013 | Baker | B29C 48/154 210/232 |
| 2013/0248464 | A1 * | 9/2013 | Schweitzer | B01D 35/005 210/791 |
| 2014/0157738 | A1 | 6/2014 | Eberle | |
| 2015/0336041 | A1 * | 11/2015 | Hatfield | B01D 46/0023 55/488 |
| 2017/0001133 | A1 | 1/2017 | Ishida et al. | |
| 2017/0296956 | A1 | 10/2017 | Ishida et al. | |
| 2018/0104633 | A1 * | 4/2018 | Bonne | F01M 13/04 |
| 2018/0304179 | A1 * | 10/2018 | Auxter | B01D 27/103 |
| 2019/0046911 | A1 * | 2/2019 | Deshpande | F01M 13/04 |

(56) References Cited

U.S. PATENT DOCUMENTS

| | | | |
|---|---|---|---|
| 2020/0108337 A1* | 4/2020 | Kolczyk | B01D 35/147 |
| 2020/0276527 A1* | 9/2020 | Macoretta | B67D 3/0061 |

FOREIGN PATENT DOCUMENTS

| | | | | |
|---|---|---|---|---|
| DE | 10300976 A1 | 7/2003 | | |
| DE | 10338770 A1 | 3/2005 | | |
| DE | 10 2004 030 910 A1 | 1/2006 | | |
| DE | 10 2007 043 462 B3 | 2/2009 | | |
| DE | 10 2008 033 638 A1 | 2/2009 | | |
| DE | 10 2008 030 028 A1 | 12/2009 | | |
| DE | 10 2009 019 950 A1 | 11/2010 | | |
| DE | 10 2009 018 000 A1 | 12/2010 | | |
| DE | 10 2009 035 895 B4 | 5/2012 | | |
| DE | 10 2010 035 217 B4 | 9/2013 | | |
| EP | 0 982 059 | 5/2000 | | |
| EP | 1 645 320 A1 | 4/2006 | | |
| EP | 2 335 798 A1 | 6/2011 | | |
| EP | 1 987 872 | 10/2011 | | |
| EP | 2 654 921 A2 | 10/2013 | | |
| GB | 0 800 796 | 9/1958 | | |
| GB | 1 003 164 | 9/1965 | | |
| GB | 2 457 598 A | 8/2009 | | |
| WO | WO84/04050 | 10/1984 | | |
| WO | WO-2005083240 A1 * | 9/2005 | | B01D 46/003 |
| WO | WO2012/088317 | 6/2012 | | |
| WO | WO-2016/170248 A2 | 10/2016 | | |
| WO | WO-2017/053267 | 3/2017 | | |
| WO | WO-2018/002244 A1 | 1/2018 | | |

OTHER PUBLICATIONS

International Search Report and Written Opinion issued for PCT Application No. PCT/US2019/033238 dated Aug. 6, 2019, 8 pages.

Extended Search Report issued for European Patent Application No. 16849412.8, dated Apr. 2, 2019, 7 pages.

International Search Report and Written Opinion issued for PCT/US2016/052600, dated Dec. 16, 2016, 9 pages.

Extended European Search Report issued for European Patent Application No. EP 19808501.1 dated Jan. 18, 2022, 9 pages.

* cited by examiner

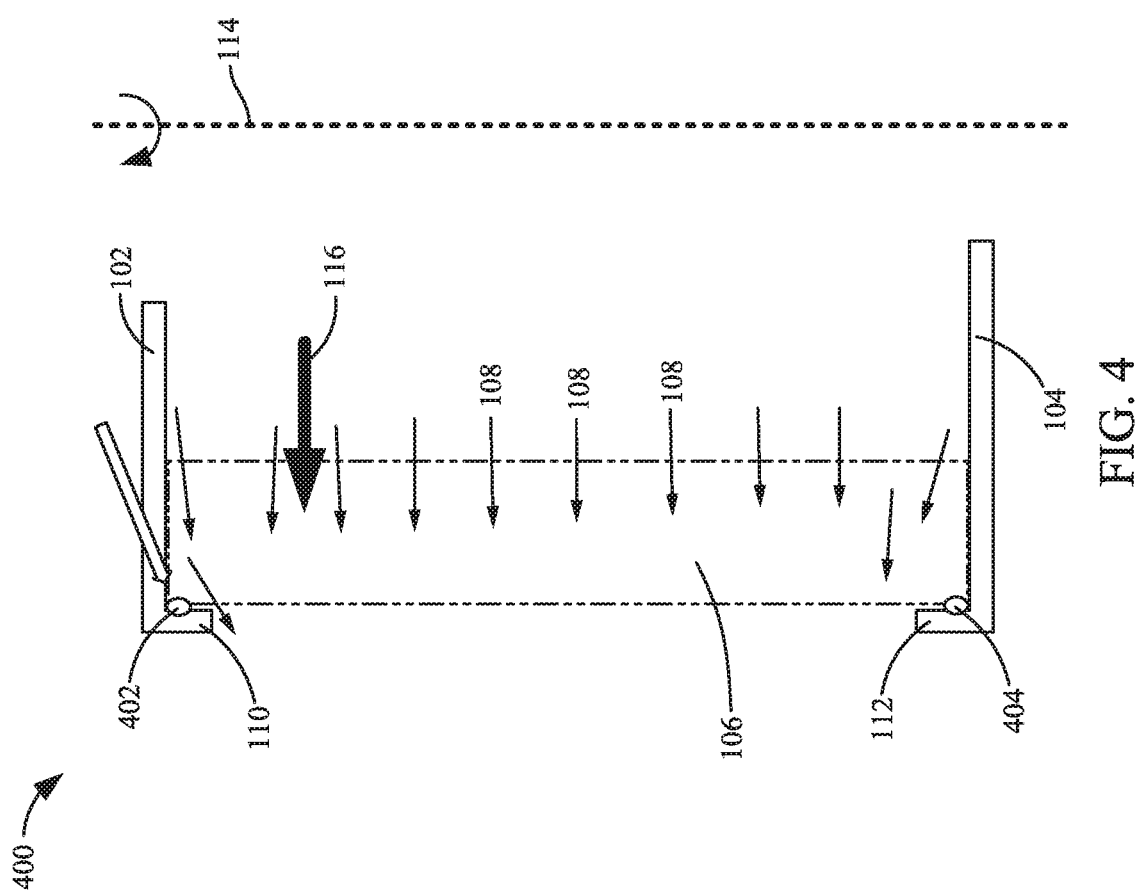

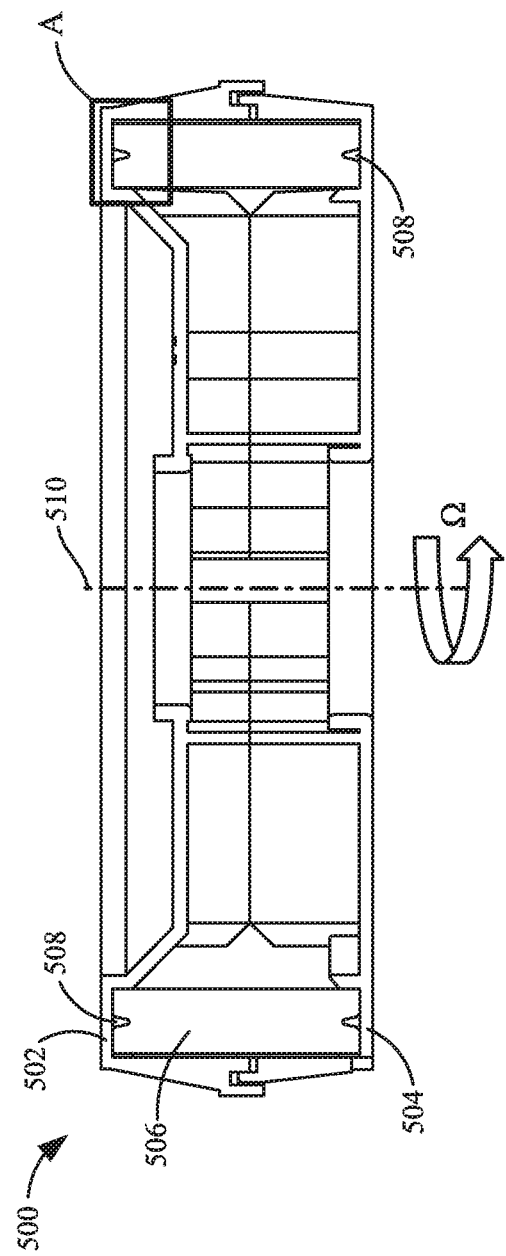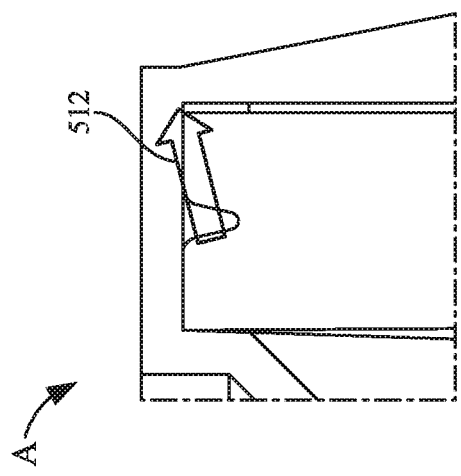

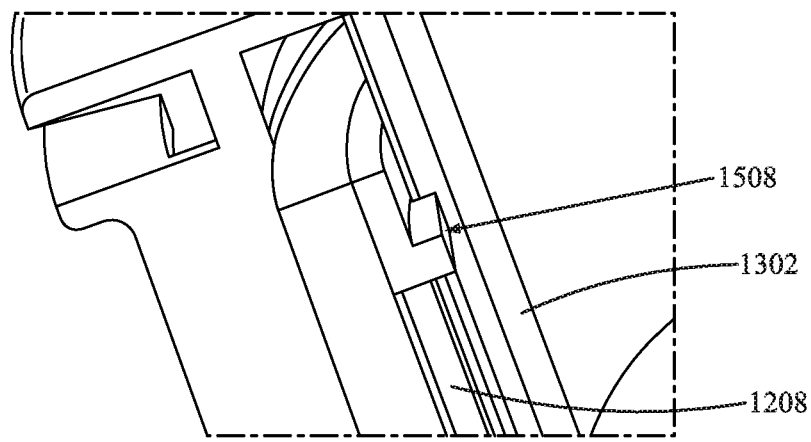
FIG. 16E
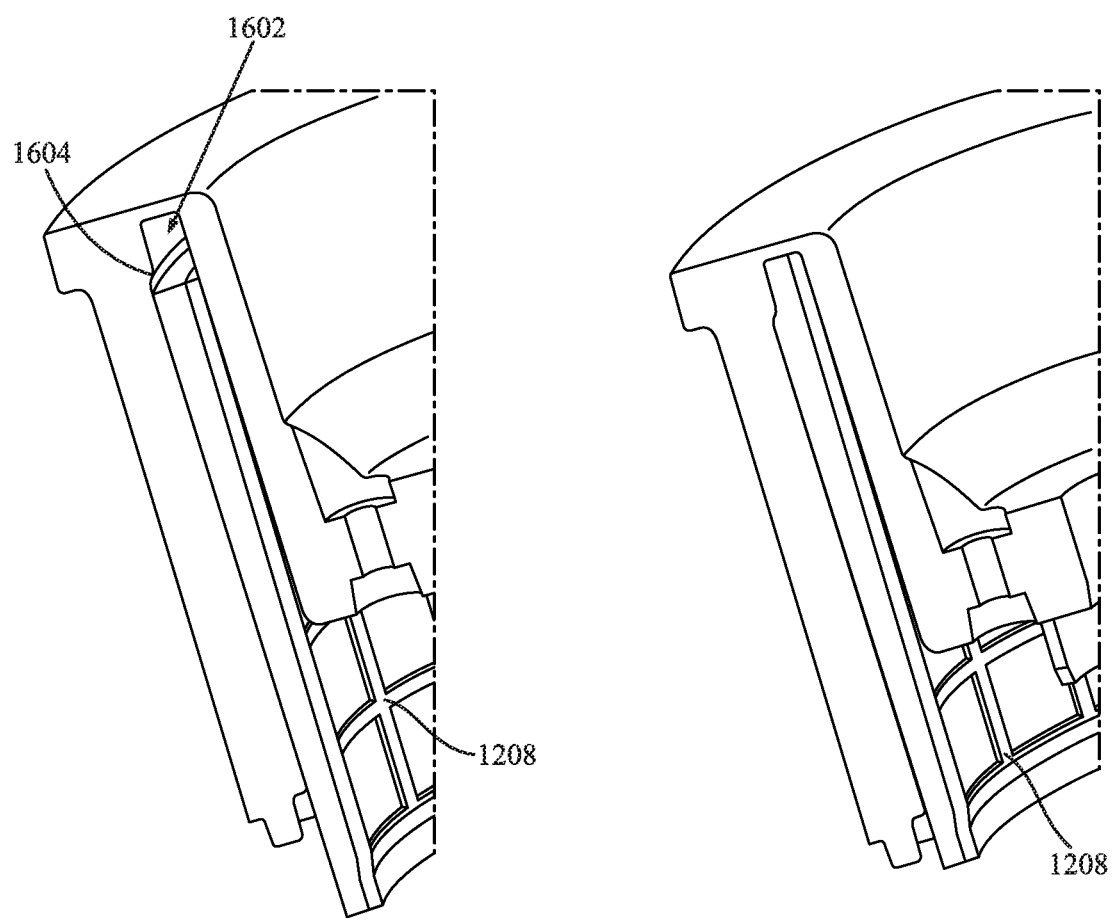
FIG. 16F
FIG. 16G

UTILIZING A MECHANICAL SEAL BETWEEN A FILTER MEDIA AND AN ENDCAP OF A ROTATING FILTER CARTRIDGE

CROSS-REFERENCE TO RELATED APPLICATIONS

This application is a National Stage of PCT Application No. PCT/US2016/052600, filed Sep. 20, 2016, which is related to and claims priority to U.S. Provisional Patent Application No. 62/232,073, entitled "SYSTEMS AND METHODS FOR UTILIZING A MECHANICAL SEAL BETWEEN A FILTER MEDIA AND AN ENDCAP OF A ROTATING FILTER CARTRIDGE," by Deshpande et al., filed on Sep. 24, 2015. The contents of both applications are herein incorporated by reference in their entirety and for all purposes.

TECHNICAL FIELD

The present application relates to rotating filter cartridges.

BACKGROUND

During operation of an internal combustion engine, various gases and liquids pass through filter elements. Some filtration systems, such as crankcase ventilation systems, utilize rotating filter cartridges that increase filter efficiency by rotating the filter media during filtering. Performance attributes of rotating filter cartridges may be measured in terms of pressure drop (or rise) through the device and efficiency of contaminant removal. In rotating filter cartridges, the contaminants (e.g., oil droplets suspended and transported by blowby gases) are separated inside the filter media of the filter cartridge through the particle capture mechanisms of inertial impaction, interception, and diffusion onto the fibers. By rotating the filter media, inertial impaction is enhanced by the additional centrifugal force. Additionally, the rotation of the filter cartridge can create a pumping effect, which reduces the pressure drop through the filtration system. Rotating filter cartridges may include fibrous filters as well as centrifugal separation devices.

The rotating filter media is typically potted with urethane, epoxy or embedded into the top and bottom end caps of the filter cartridge. The potting of the filter media in glue provides effective seal by ensuring fluid flows through the thickness of the filter media without permitting bypass of the filter media (i.e., without permitting bypass flow). The potting process, however, results in significantly higher manufacturing costs due to extra material costs, additional manufacturing overhead, and added complexity to the assembly process. Further, if the potting material is not evenly dispersed between the endcap and the filter media, the uneven potting material can lead to the filter media sitting unevenly in the end caps, which can cause a weight imbalance of the filter cartridge. The weight imbalance may cause unnecessary vibrations during rotation of the filter cartridge and can reduce bearing life. Still further, if the potting material is not distributed uniformly, the potting material can blind off functional filtration areas of the filter media, which can negatively impact filter efficiency, reduce rotational speed of the element, and reduce bearing life.

SUMMARY

One example embodiment relates to a rotating filter cartridge. The rotating filter cartridge includes a first endcap, a second endcap, and filter media positioned between the first endcap and the second endcap. The filter media creates a mechanical seal between at least one of the first endcap or the second endcap during rotation of the rotating filter cartridge without the use of a potting material.

Another example embodiment relates to a method of assembling a rotating filter cartridge. The method includes providing an inner cage. The method further includes fitting filter media around an outer surface of the inner cage. The method includes inserting a first end of the filter media and the inner cage into a first endcap, thereby creating a mechanical seal between the first end of the filter media and the first endcap. The method further includes inserting a second end of the filter media and the inner cage into a second endcap.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 4 is a cross-sectional view of a rotating filter cartridge according to a further example embodiment.

FIGS. 5A through 5C are cross-sectional views of another rotating filter cartridge.

DETAILED DESCRIPTION

Referring to the figures generally, rotating filter cartridges (e.g., a rotating coalescers) for a rotating filtration system (e.g., rotating coalescer crankcase ventilation systems) are described. The described filter cartridges use mechanically created seals (i.e., seals formed by the contacting or interaction of two separate physical components) to seal the filter media to the endcaps of the filter cartridges. Accordingly, the described filter cartridges eliminate the need to use a potting or embedding material during manufacturing of the filter cartridge, thereby eliminating the above-described costs and potential manufacturing defects associated with the potting or embedding material. In some arrangements, centrifugal force during cartridge rotation presses the filter media against an endcap lip to form a seal between the filter media and the endcap. In other arrangements, a pin or a rib of each endcap secures the filter media in position in the endcap. In further arrangements, the endcaps are designed to radially pinch or clamp the filter media in position. In other arrangements, the endcaps can be overmolded with a gasket material to form an axial seal between the filter media and the endcaps.

Figure 1:
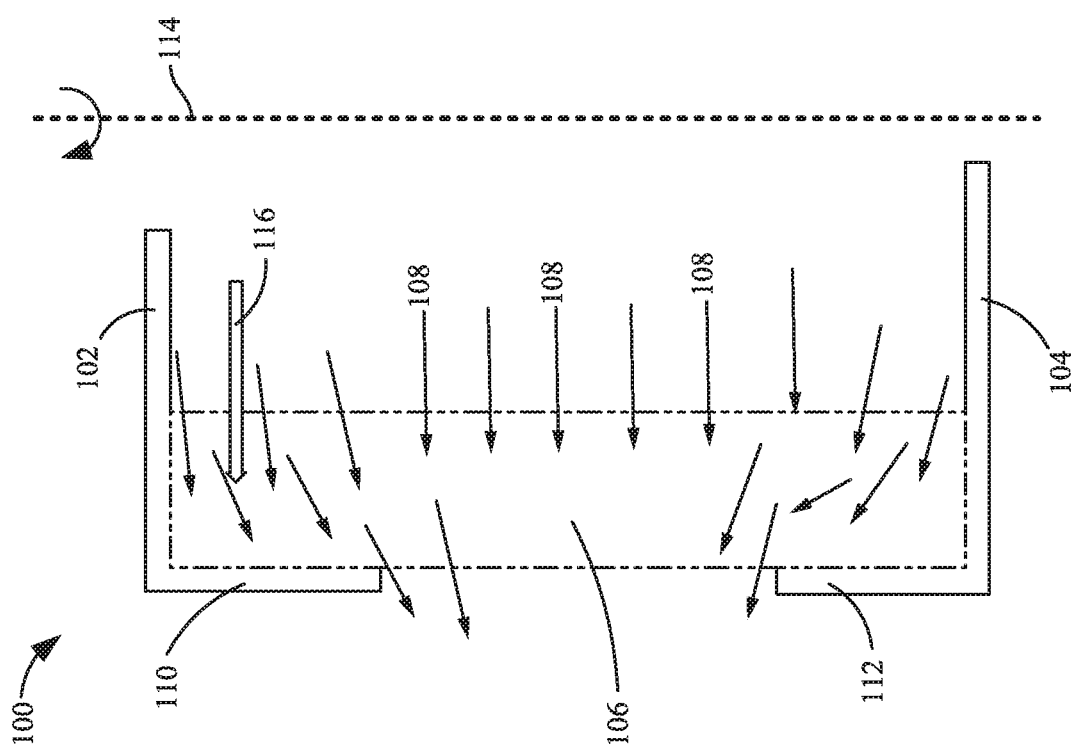
FIG. 1 is cross-sectional view of a rotating filter cartridge according to an example embodiment.

Referring to FIG. 1, a cross-sectional view of a rotating filter cartridge 100 is shown according to an example embodiment. In some arrangements, the rotating filter cartridge 100 is a cylindrical filter cartridge. The filter cartridge 100 includes a first endcap 102 and a second endcap 104. A filter media 106 is positioned between the first endcap 102 and the second endcap 104. The filter media 106 may include, for example, a fibrous filter media, a paper filter media, a synthetic filter media, a nanofiber filter media, or the like. The filter media 106 is configured to filter a fluid 108 (designated by the flow arrows) in an inside-out manner. In some arrangements, the filter cartridge 100 is a rotating coalescer of a crankcase ventilation system. In such arrangements, the fluid 108 is crankcase blowby gases, and the filter media 106 is designed to remove oil and aerosol from the crankcase blowby gases.

The first endcap 102 includes a first circumferential lip 110, and the second endcap 104 includes a second circumferential lip 112. The first circumferential lip 110 and the second circumferential lip 112 define a gap where a clean side of the filter media 106 is exposed. The filtered fluid 108 flows through the gap. During operation, the filter cartridge 100 is rotated about its central axis 114. The rotation exerts a centrifugal force 116 on the filter media 106, which presses the filter media 106 against the first and second circumferential lips 110 and 112. The pressing of the filter media 106 against the circumferential lips 110 and 112 forms a mechanical seal between the filter media 106 and the first and second endcaps 102 and 104. The mechanical seal is a radial seal that prevents the fluid 108 from bypassing the filter media 106. The height of the first and second circumferential lips 110 and 112 directly affects the strength of the seal formed between the filter media 106 and the first and second endcaps 102 and 104. In some arrangements, the height of the first and second circumferential lips 110 and 112 is at least 5 mm. Accordingly, the seal formed between the filter media 106 and the first and second endcaps 102 and 104 is formed without the use of a potting material (e.g., urethane, glue, etc.).

In some arrangements, the second circumferential wall 112 is constructed with a draft angle such that the second circumferential wall 112 is not parallel with the central axis 114. In some arrangements, the draft angle is greater than 0.3 degrees. The draft angle assists in draining contaminants (e.g., oil and aerosol) separated from the fluid 108 by helping the contaminants overcome the centrifugal force 116. Alternatively or in addition to the draft angle, drainage channels can be formed in the second endcap 104 that assist with draining of the contaminants without creating a bypass or leak path for the fluid 108 to bypass the filter media 106. The additional drainage prevents weight increase of the filter media 106 due to contaminant accumulation and helps maintain filter cartridge 100 balance during high speed rotations.

Figure 2:
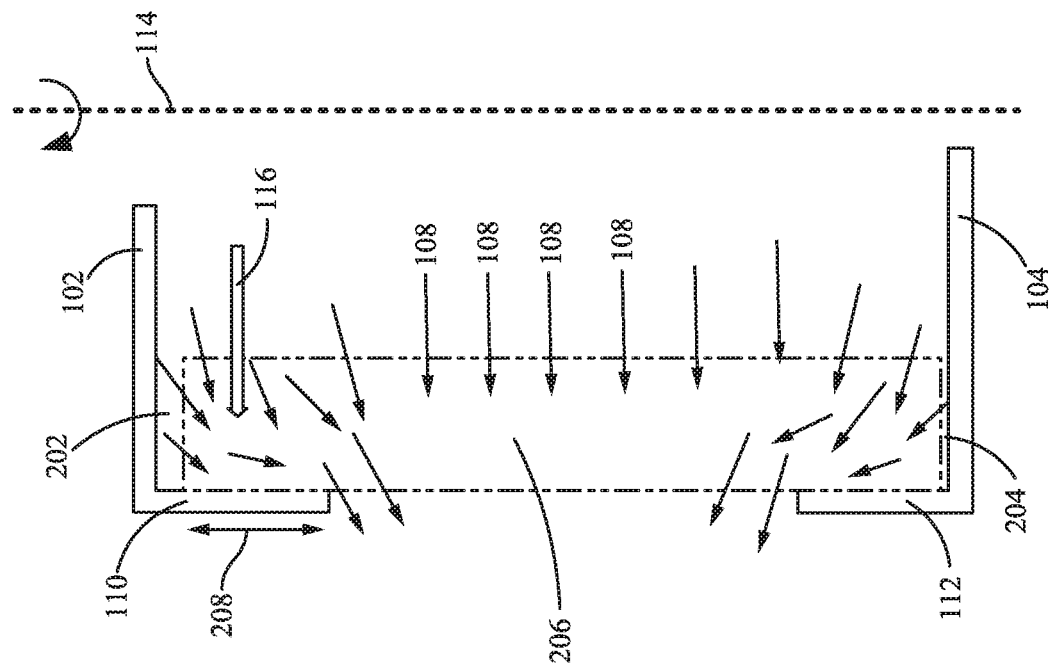
FIG. 2 is a cross-sectional view of a rotating filter cartridge according to another example embodiment.

Referring to FIG. 2, a cross-sectional view of a rotating filter cartridge 200 is shown according to an example embodiment. The rotating filter cartridge 200 is similar to the rotating filter cartridge 100. Accordingly, like numbering is used for the like elements between filter cartridge 100 and filter cartridge 200. The primary difference between filter cartridge 100 and filter cartridge 200 is that the filter media 206 has a shorter axial length than the filter media 106 with respect to the distance between the first and second endcaps 102 and 104. Accordingly, a first gap 202 exists between the first endcap 102 and the filter media 206, and a second gap 204 may exist between the second endcap 104 and the filter media 206. In arrangements where the second endcap 104 is a bottom endcap in the direction of gravity, the second gap 204 may be smaller than the first gap 202 or nonexistent. The first and second gaps 202 and 204 allow the fluid 108 being filtered to enter the filter media 206 through the axial ends of the filter media as shown by the flow arrows.

As described above with respect to the rotating filter cartridge 100, the filter cartridge 200 is rotated about its central axis 114 during operation. The rotation exerts a centrifugal force 116 on the filter media 206, which presses the filter media 206 against the first and second circumferential lips 110 and 112. The pressing of the filter media 206 against the circumferential lips 110 and 112 forms a mechanical seal between the filter media 206 and the first and second endcaps 102 and 104. The mechanical seal is a radial seal that prevents the fluid 108 from bypassing the filter media 206. The height 208 of the first and second circumferential lips 110 and 112 directly affects the strength of the seal formed between the filter media 206 and the first and second endcaps 102 and 104. The height 208 of the circumferential lips 110 and 112 is greater than the difference between the axial height of the filter media 206 and the axial distance between the first and second endcaps 102 and 104. Accordingly, the height 208 of the circumferential lips 110 and 112 is sufficiently tall such that the fluid 108 is forced to pass through a distance of the filter media 206 that is approximately the thickness of the filter media 106. In some arrangements, the height 208 is at least 5 mm greater than the difference between the axial height of the filter media 206 and the axial distance between the first and second endcaps 102 and 104. Accordingly, the seal formed between the filter media 206 and the first and second endcaps 102 and 104 is formed without the use of a potting material (e.g., urethane, glue, etc.).

As with the filter cartridge 100, the second circumferential wall 112 of the filter cartridge 200 may be constructed with a draft angle such that the second circumferential wall 112 is not parallel with the central axis 114. In some arrangements, the draft angle is greater than 0.3 degrees. The draft angle assists in draining contaminants (e.g., oil and aerosol) separated from the fluid 108 by helping the contaminants overcome the centrifugal force 116. Alternatively or in addition to the draft angle, drainage channels can be formed in the second endcap 104 that assist with draining of the contaminants without creating a bypass or leak path for the fluid 108 to bypass the filter media 206. The additional drainage prevents weight increase of the filter media 206 due to contaminant accumulation and helps maintain the filter cartridge 200 balance during high speed rotations.

Figure 3:
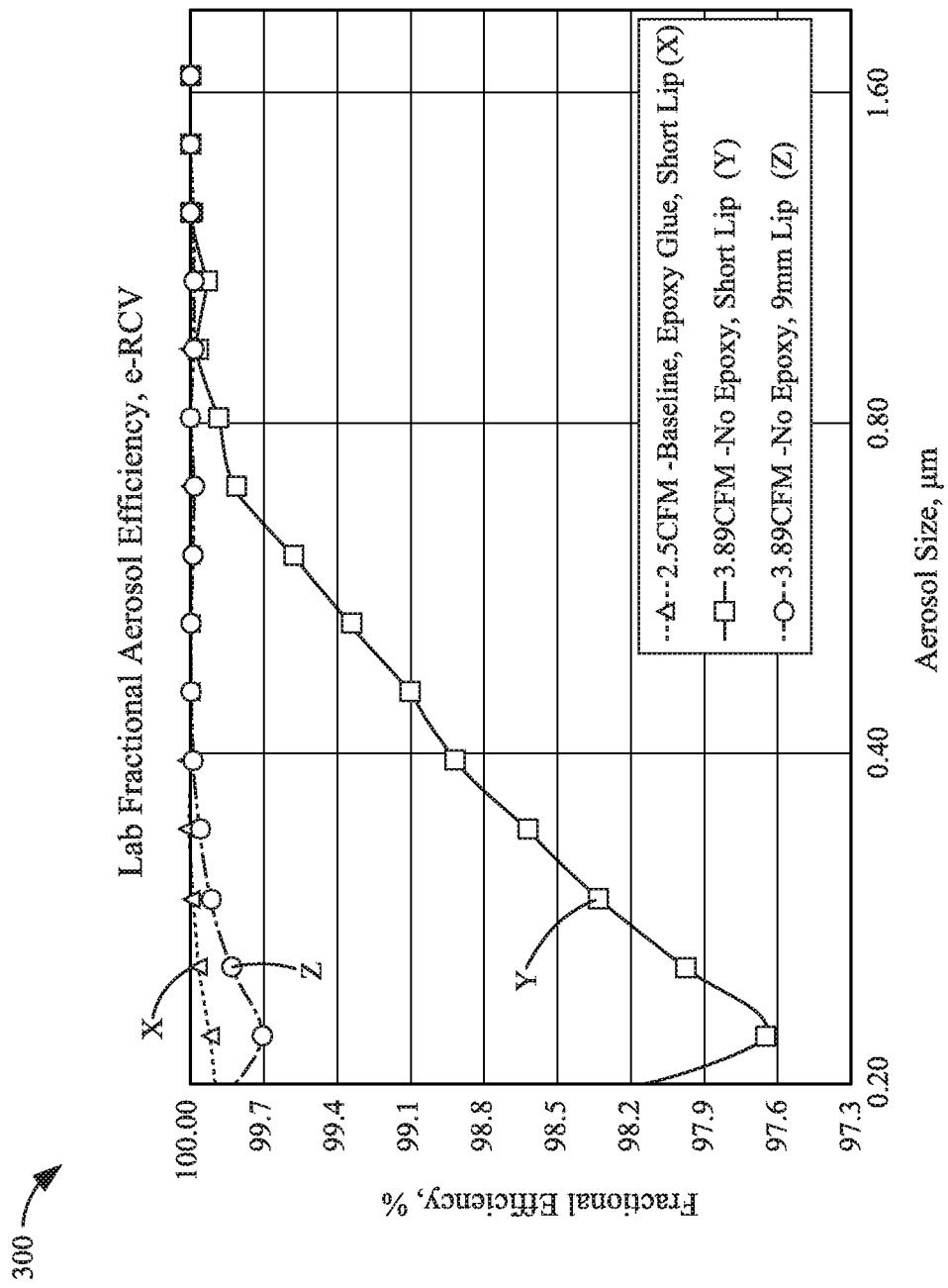
FIG. 3 is a graph of fractional efficiency percentage vs. aerosol size for various rotating filter cartridges.

Referring to FIG. 3, a graph 300 of fractional efficiency percentage vs. aerosol size is shown. The graph 300 shows the change in fractional efficiency by eliminating the potting material and using centrifugal forces instead to seal filter media against the endcaps of a rotating filter cartridge (e.g., as discussed above with respect to filter cartridges 100 and 200). As shown in graph 300, no significant loss in fractional efficiency is noted by replacing the potting material seal (represented by the baseline points X) with a mechanical seal formed by centrifugal forces that press the filter media against the endcaps designed with a tall (e.g., 9 mm) circumferential endcap lip, which is the arrangement represented by points Z on the graph 300.

FIG. 4 is a cross-sectional view of a rotating filter cartridge 400 according to an example embodiment. The rotating filter cartridge 400 is substantially the same as the rotating filter cartridge 100. The only difference between filter cartridge 100 and filter cartridge 400 is that filter cartridge 400 additionally includes a first gasket 402 and a second gasket 404. Accordingly, like numbering is used for the like elements between filter cartridge 100 and filter cartridge 400. The first and second gaskets 402 and 404 may be o-rings. The first gasket 402 is positioned between the filter media 106 and the first circumferential lip 110. The second gasket 404 is positioned between the filter media 106 and the second circumferential lip 112. The gaskets 402 and 404 assist in creating the mechanical seal between the filter media 106 and the first and second endcaps 102 and 104 caused by the centrifugal force 116 during rotation of the filter cartridge 400. The centrifugal force 116 forces the filter media 106 into contact with the gaskets 402 and 404, which are in turn pressed against the first and second circumferential lips 110 and 112, thereby creating the mechanical seals. Accordingly, the seal formed between the filter media 106 and the first and second endcaps 102 and 104 is formed without the use of a potting material (e.g., urethane, glue, etc.). In some arrangements, the o-ring enables the first and second circumferential lips 110 and 112 to have a smaller height than in filter cartridge 100. In such arrangements, a larger circumferential area of the filter media 106 is exposed, which can reduce pressure drop caused by the filter cartridge 400 in comparison to the filter cartridge 100.

Figure 5C:
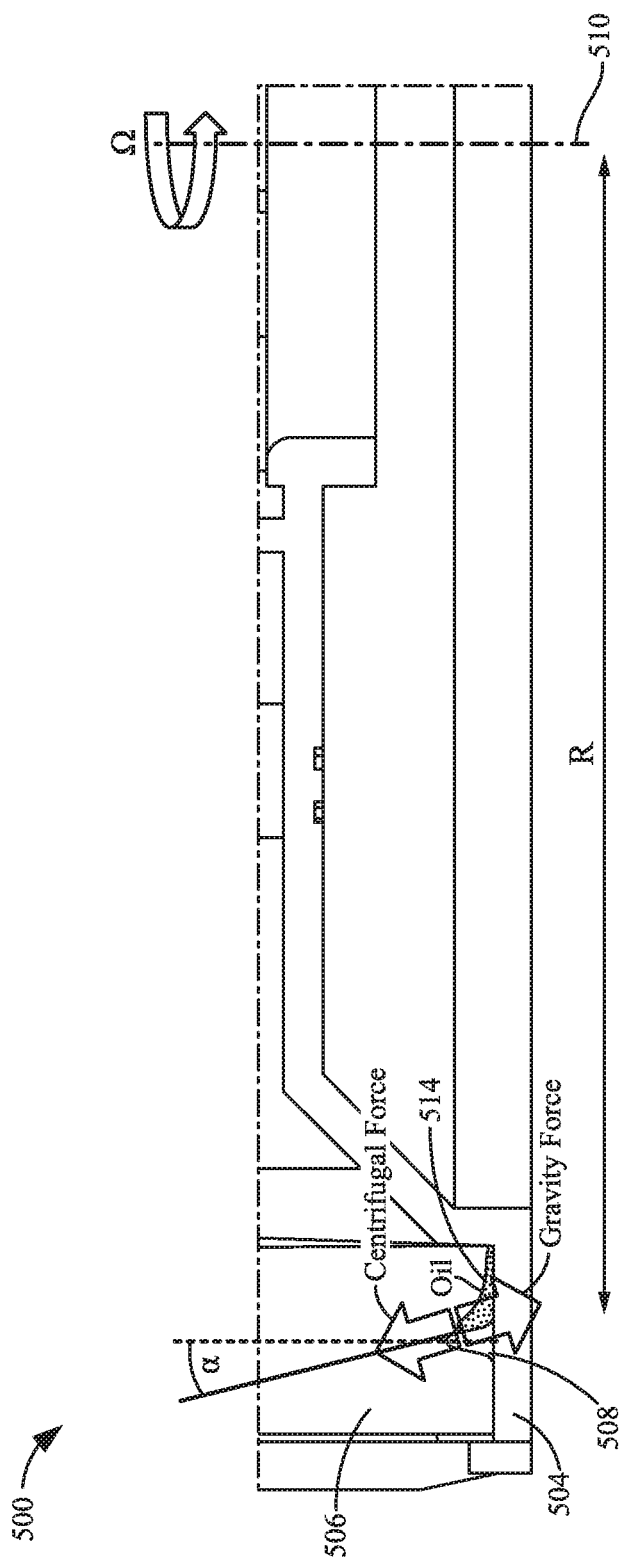

Referring to FIGS. 5A through 5C, cross-sectional views of a rotating filter cartridge 500 are shown according to an example embodiment. In some arrangements, the rotating filter cartridge 500 is a cylindrical filter cartridge. The filter cartridge 500 includes a first endcap 502 and a second endcap 504. Filter media 506 is positioned between the first endcap 502 and the second endcap 504. The filter media 506 may include, for example, a fibrous filter media, a paper filter media, a synthetic filter media, a nanofiber filter media, or the like. The filter media 506 is configured to filter a fluid in an inside-out manner (e.g., in the same manner as described above with respect to filter cartridges 100, 200, and 400). In some arrangements, the filter cartridge 500 is a rotating coalescer of a crankcase ventilation system. In such arrangements, the fluid is crankcase blowby gases, and the filter media 506 is designed to remove oil and aerosol from the crankcase blowby gases.

As shown in FIG. 5A, the filter media is positioned in aligned and opposite troughs of the first and second endcaps 502 and 504. Each of the first and second endcaps 502 and 504 includes a projection 508. Each projection 508 is integrated on a respective one of the first or second endcaps 502 and 504. When the filter media 506 is installed in the filter cartridge 500 (e.g., during assembly of the filter cartridge 500), each projection 508 penetrates into the filter media 506 to secure the positioning of the filter media 506 with respect to each endcap 502 and 504. The projection 508 may comprise, for example, a pin (e.g., a circular or triangular pin), a thin ring, or a rib. The projection 508 associated with the first endcap 502 may have a different configuration than the projection 508 of the second endcap 504.

During operation, the filter cartridge 500 rotates about its central axis 510 at a rotational speed Ω. When the filter cartridge 500 is spinning, the centrifugal forces 512 will push the filter media 506 against each projection 508 (e.g., as shown in FIGS. 5B and 5C) thereby generating a mechanical seal between the filter media 506 and the first and second endcaps 502 and 504. Accordingly, the seal formed between the filter media 506 and the first and second endcaps 502 and 504 is formed without the use of a potting material (e.g., urethane, glue, etc.). After initial use, the filter media 506 may begin to lose its elasticity. Additionally, separated contaminant 514, such as oil, will accumulate around the projection 508 of the second endcap 504. The decrease in elasticity and the pooling of contaminant 514 may cause a weight increase for the filter media 506 and an overall weight imbalance during rotation of the filter cartridge 500. Accordingly the pin angle α must be greater than $\tan^{-1}(g/\Omega^{2}*R)$, where α is the pin angle in rad, g is gravity (9.81 g/m$^2$), S2 is the rotational speed in rad/s of the filter cartridge 500, and R is the distance between the center of the projection 508 and the central axis 510 in m. Additionally or alternatively, contaminant drain channels may be provided in the second endcap 504.

Figure 6:
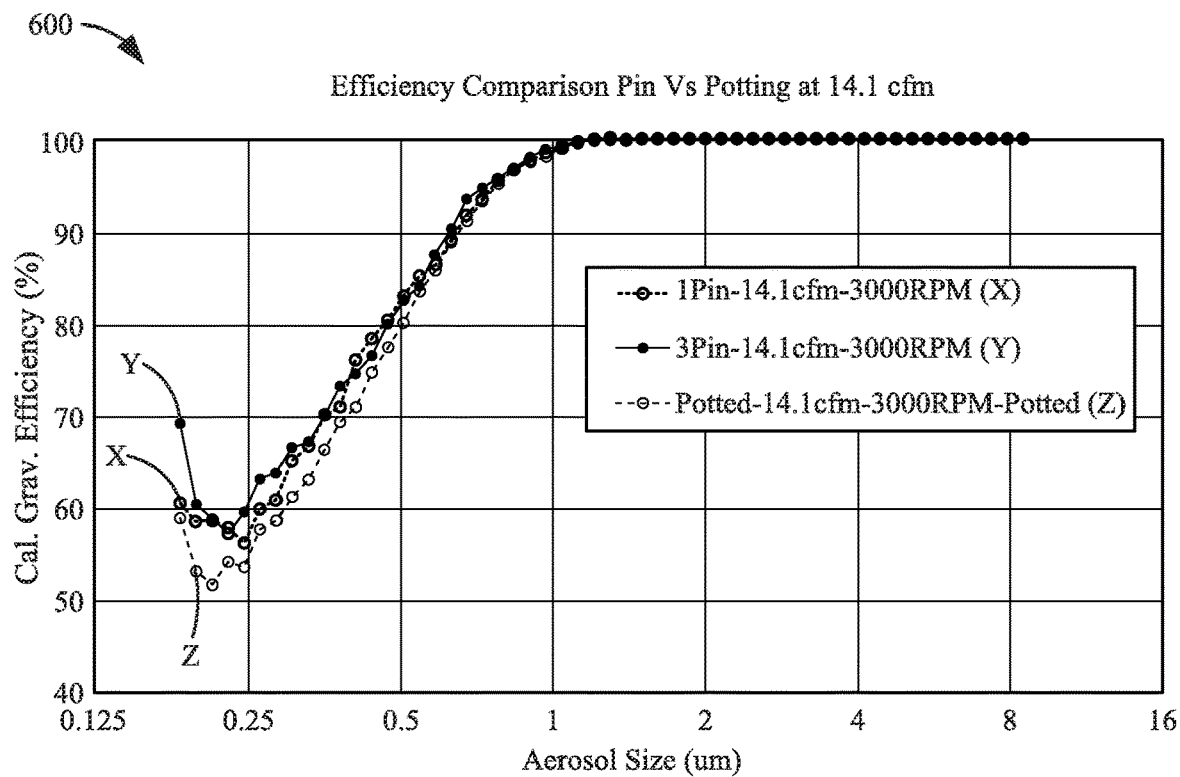
FIG. 6 is a graph showing the efficiency comparison between a potted filter media rotating filter cartridge, a rotating filter media cartridge having filter media secured through a pin, and a rotating filter cartridge having filter media secured through three pins.

FIG. 6 is a graph 600 showing the efficiency comparison between a potted filter media, a filter media secured through a pin (e.g., projection 508), and a filter media secured through three pins (e.g., three projections 508). As shown in the graph 600, there is no significant difference between the three compared arrangements at 14.1 cubic feet per minute (CFM) of air flow and at 3000 RPM of the filter cartridge.

Figure 7:
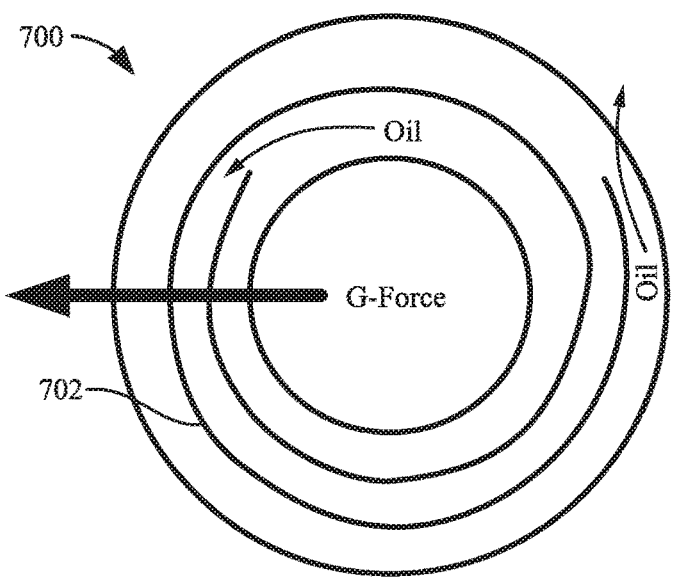
FIG. 7 is a top view of an endcap usable with the rotating filter cartridge of FIGS. 5A through 5C.

Referring to FIG. 7, a top view of an endcap 700 is shown according to an example embodiment. The endcap 700 may be used in place of either the first or second endcaps 502 or 504 in filter cartridge 500. The endcap 700 includes a projection 702 similar to the projection 508 of first and second endcaps 502 and 504. However, the projection 702 is a continuous spiral rib. In an alternative arrangement, the projection 702 retains the spiral shape but is formed from staggered arcs such that the projection 702 is not continuous. In such an arrangement, separated contaminant (e.g., oil) can pass between sections of the projection 702 for drainage. The projection 702 may be designed to utilize the centrifugal forces to drive separated contaminant (e.g., oil) outwards and towards a drain.

Figure 8:
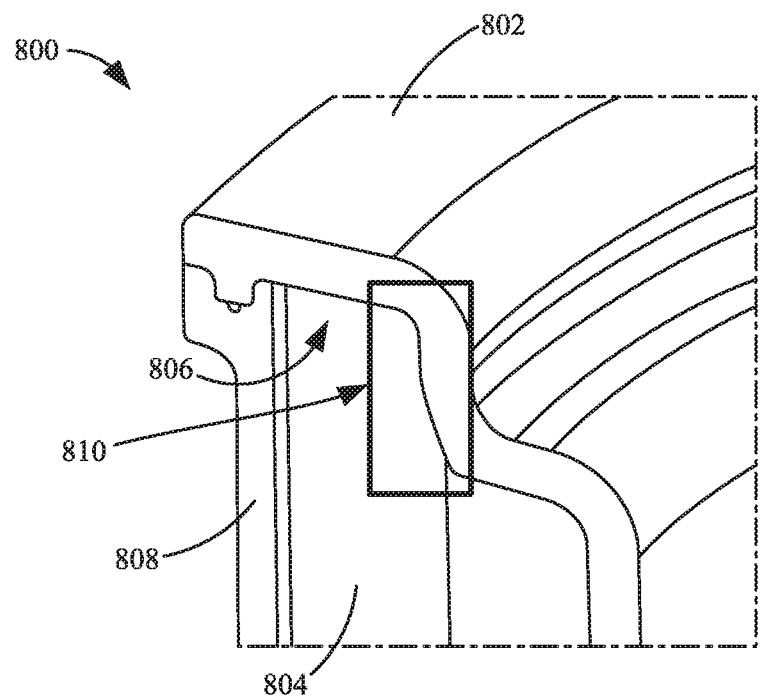
FIG. 8 is a cross-sectional view of a rotating filter cartridge according to another example embodiment.
Figure 9:
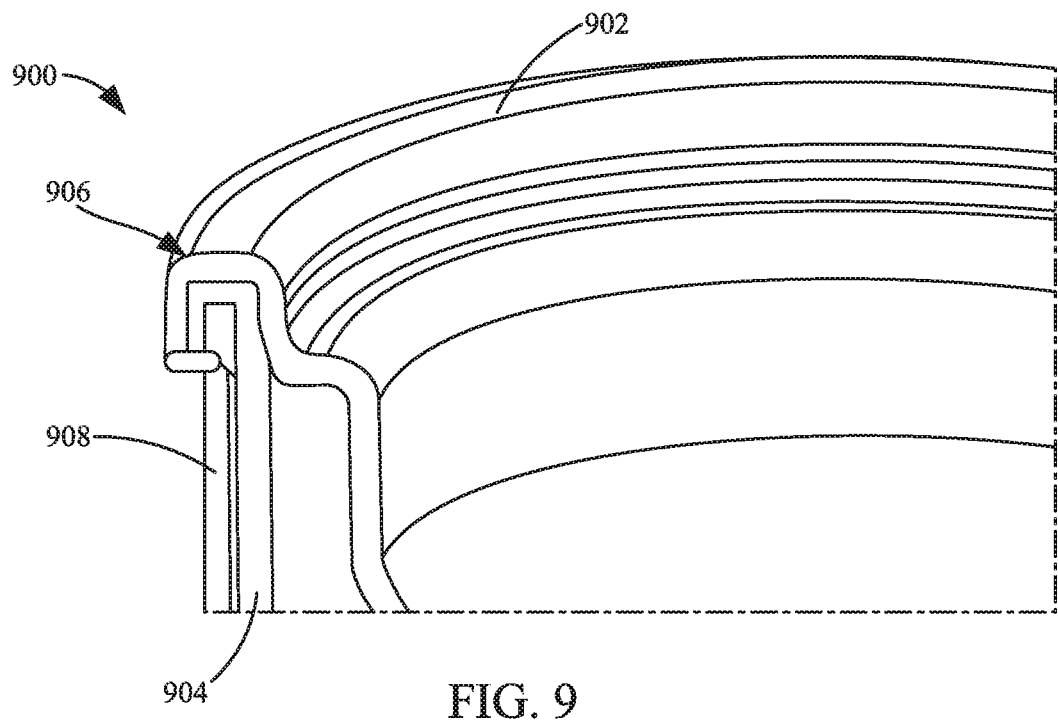
FIG. 9 is a cross-sectional view of a rotating filter cartridge according to still another example embodiment.

FIG. 8 is a cross-sectional view of a rotating filter cartridge 800 according to an example embodiment. As shown in FIG. 8, the filter cartridge 800 includes a first endcap 802 and a filter media 804. The filter media 804 is received in a pocket 806 formed in the first endcap 802. In some arrangements, the pocket 806 is formed within the first endcap 802. In other arrangements, the pocket 806 is formed in part by the first endcap 802 and in part by an outer body 808 of the filter cartridge 800, which may be secured to the first endcap 802 through sonic welding (e.g., as shown in FIG. 8), through the use of snap connection features (e.g., as described below with respect to FIGS. 20-23B), or through another suitable connection mechanism. In arrangements where sonic welding is used (e.g., as shown in FIG. 8), the sonic weld may be positioned at the outer diameter (i.e., the clean side) of the filter media 804. The pocket 806 is narrower than a width of the filter media 804. Accordingly, when the filter media 804 is inserted into the pocket 806, the pocket 806 radially pinches or traps the filter media 804 in the pocket 806 at the inner or outer circumference of the filter media 804 as shown in section 810. The radial pinch or trap effect creates a radial seal between the filter media 804 and the first endcap 802. Accordingly, the seal formed between the filter media 804 and the first endcap 802 is formed without the use of a potting material (e.g., urethane, glue, etc.). Although the cross-sectional view of FIG. 8 only shows the interaction between the first endcap 802 and the filter media 804, it should be understood that the described pinching technique may also be used between the filter media 804 and the second endcap (not shown). Referring to FIG. 9, a cross-sectional view of a rotating filter cartridge 900 is shown according to another example embodiment. The filter cartridge 900 includes a first endcap 902 and a filter media 904. An axial seal between the filter media 904 and the first endcap 902 prevents fluid being filtered through the filter media 904 from bypassing the filter media. The axial seal is formed by radially and axially pinching the filter media 904 in a pocket 906 formed in the first endcap 902. The pocket 906 has a larger width than a width of the filter media 904. The pinching effect is achieved by insertion of an additional member 908 in the pocket 906 as shown in FIG. 9. The radial pinch or trap effect creates an axial seal between the filter media 904 and the first endcap 902. Accordingly, the seal formed between the filter media 904 and the first endcap 902 is formed without the use of a potting material (e.g., urethane, glue, etc.). Although the cross-sectional view of FIG. 9 only shows the interaction between the first endcap 902 and the filter media 904, it should be understood that the described pinching technique may also be used between the filter media 904 and the second endcap (not shown).

Figure 10:
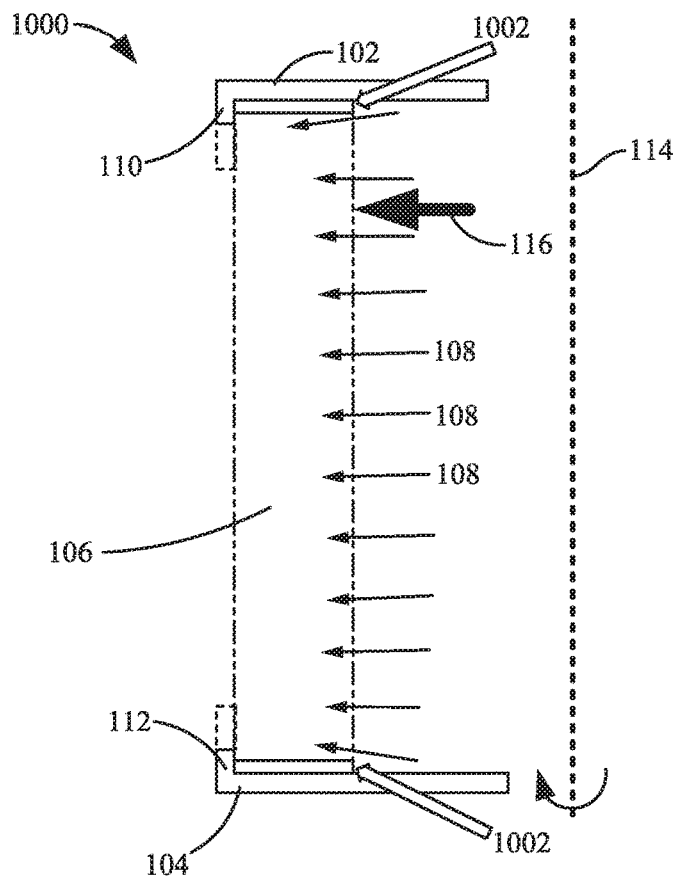
FIG. 10 is a cross-sectional view of a rotating filter cartridge according to a further example embodiment.

FIG. 10 is a cross-sectional view of a rotating filter cartridge 1000 is shown according to still another example embodiment. The rotating filter cartridge 1000 is substantially the same as the rotating filter cartridge 100. The only difference between filter cartridge 1000 and filter cartridge 100 is that filter cartridge 1000 includes an overmolding of a sponge material 1002 on the inner surface of the first and second endcaps 102 and 104. Accordingly, like numbering is used for the like elements between filter cartridge 100 and filter cartridge 1000. The sponge material 1002 is a compressible material that may be used to form gaskets. The sponge material 1002 forms axial sealing surfaces between the first and second endcaps 102 and 104 and the filter media 106. The compression holding together the first and second endcaps 102 and 104 maintains the axial seal between the filter media 106 and the first and second endcaps 102 and 104. Accordingly, the seal formed between the filter media 106 and the first and second endcaps 102 and 104 is formed without the use of a potting material (e.g., urethane, glue, etc.). The compressible nature of the sponge material 1002 also accounts for variations in the filter media 106 height and/or the filter cartridge 1000 outer body dimensions. In some arrangements, the sponge material 1002 is a lofty and porous media, such as felt, such that the sponge material 1002 both account for dimensional variations and also provide additional filtration in and of itself.

Figure 11:
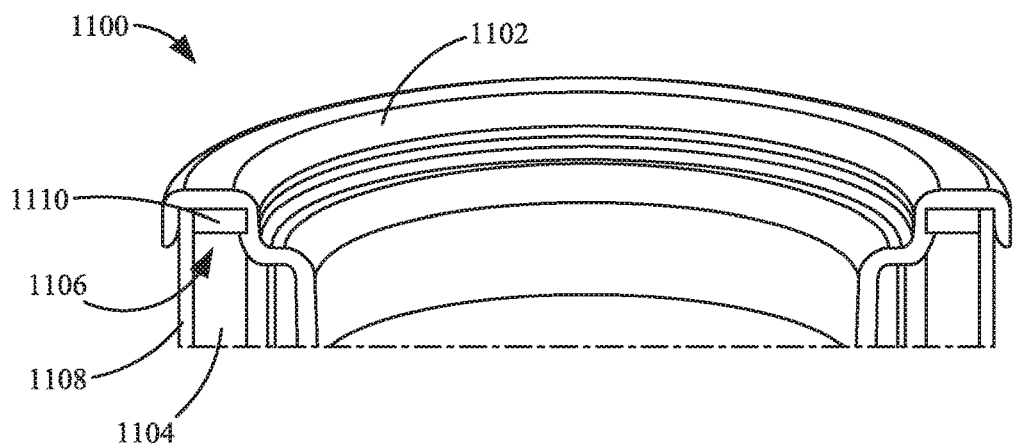
FIG. 11 is a cross-sectional view of a rotating filter cartridge according to an example embodiment.

Referring to FIG. 11, a cross-sectional view of a rotating filter cartridge 1100 is shown according to yet another example embodiment. The rotating filter cartridge 1100 combines the sealing techniques of the rotating filter cartridge 1000 (as described above with respect to FIG. 10) and the rotating filter cartridge 800 (as described above with respect to FIG. 8). Accordingly, the filter cartridge 1100 includes a first endplate 1102 and a filter media 1104. The filter media 1104 is received in a pocket 1106 formed in the first endcap 1102. In some arrangements, the pocket 1106 is formed within the first endcap 1102. In other arrangements, the pocket 1106 is formed in part by the first endcap 1102 and in part by an outer body 1108 of the filter cartridge 1100. The pocket 1106 is narrower than a width of the filter media 1104. Accordingly, when the filter media 1104 is inserted into the pocket 1106, the pocket 1106 radially pinches or traps the filter media 1104 in the pocket 1106 at the inner or outer circumference of the filter media 1104 as shown in section 810. The radial pinch or trap effect creates a radial seal between the filter media 1104 and the first endcap 1102. Additionally, the pocket 1106 includes a sponge material 1110 on the inner surface of the first endcap 1102. The sponge material 1110 may be the same sponge material 1110 described above with respect to sponge material 1002. The sponge material 1110 forms an axial sealing surface between the first endcap 1102 and the filter media 1104. The compression holding together the first endcap 1102 and the second endcap maintains the axial seal between the filter media 1104 and the first endcap 1102. Accordingly, the seal formed between the filter media 1104 and the first endcap 1102 is formed without the use of a potting material (e.g., urethane, glue, etc.). Although the cross-sectional view of FIG. 11 only shows the interaction between the first endcap 1102 and the filter media 1104, it should be understood that the described sealing technique may also be used between the filter media 1104 and the second endcap (not shown).

The above-described sealing techniques between filter media and endcaps of a rotating filter cartridge may be combined within a single embodiment. For example, a first sealing technique may be used between a first endcap and the filter media, and a second sealing technique may be used between the second endcap and the filter media. In filtration systems where a radial seal or axial seal alone are not sufficient to prevent fluid bypassing the filter media, a combination of radial and axial seals can be achieved without the need to pot media in glue (e.g., as described above with respect to FIG. 11).

Each of the above-described sealing techniques form mechanical seals that replace seals typically formed by a potting compound (e.g., adhesive, epoxy, urethane, etc.). However, another function of potting compound is also to hold the end plates together (e.g., holding endplate 102 and 104 together axially via the securing of the filter media 106 to each endplate). Different modifications can be made to each of the above described rotating filter cartridges to secure the endplates. For example, the endplates can be secured via a snap fit, via a plastic weld, or through the use of fasteners between the endcaps and/or a component connecting the endcaps. The snap fit or weld can be on the inner portion of the filter cartridge (e.g., on a dirty side of the filter media) or on an outer portion of the filter cartridge (e.g., on a clean side of the filter media). In arrangements where the connection is made on an outer portion of the filter media, the connection can be made via a media cage or solid shell. If a media cage or solid shell is used, the snap fit connection can be formed between the end plates and the cage or shell itself. In arrangements where a plastic weld is used, the plastic weld may be achieved by a sonic welding technique. The sonic welding technique utilizes energy directors, which are preferably positioned on the inside portion of the given endplate for optimal sonic welding geometry. Example snap fit connections are described below with respect to FIGS. 20 through 23B. Example sonic or plastic weld connections are described below with respect to FIGS. 24A and 24B. Example fastener-based connections are described below with respect to FIGS. 18A through 18D.

Figure 12:
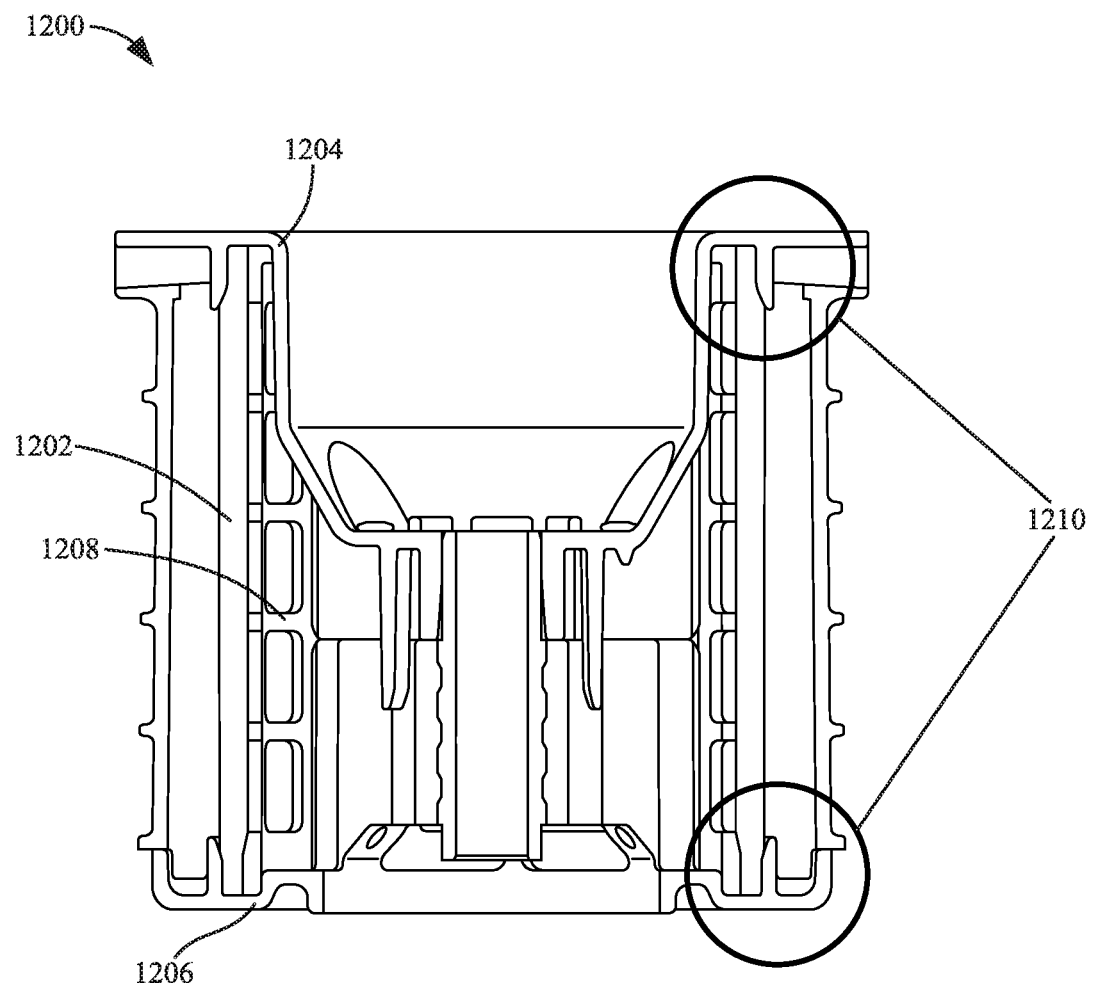
FIG. 12 is a cross-sectional view of a filter element according to a further example embodiment.

Referring to FIG. 12, a cross-sectional view of a filter element 1200 is shown according to an example embodiment. The filter element 1200 is a rotating coalescer that may be used in a crankcase ventilation system. The filter element 1200 is manufactured according to the above-described arrangements. Accordingly, the filter element 1200 includes filter media 1202, a first endcap 1204, and a second endcap 1206. An inner cage 1208 is adjacent to and supports the filter media 1202. The filter media 1202 is secured to and sealed to the first endcap 1204 and the second endcap 1206 by radial compression created by the inner cage 1208 and the first endcap 1204 and the second endcap 1206 as shown in areas 1210. Additionally, the seal is enhanced by the centrifugal forces generated during rotation of the filter element 1200. The individual components of the filter element 1200 and the assembly process for the filter element 1200 are described in further detail below with respect to FIGS. 13A through 18D.

Figure 13A:
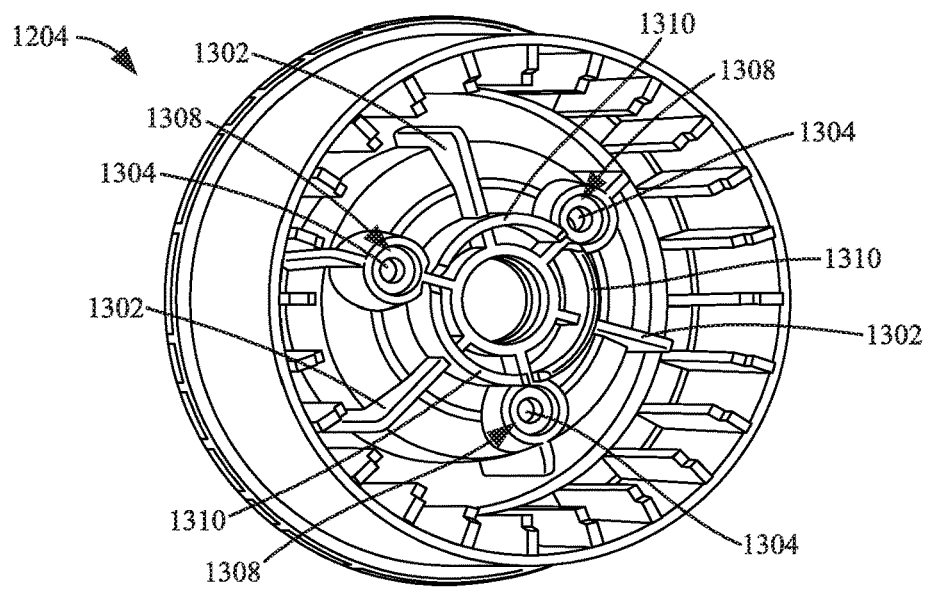
FIGS. 13A through 18D show views of the components of the filter element of FIG. 12 during various stages of the assembly process.
Figure 13B:
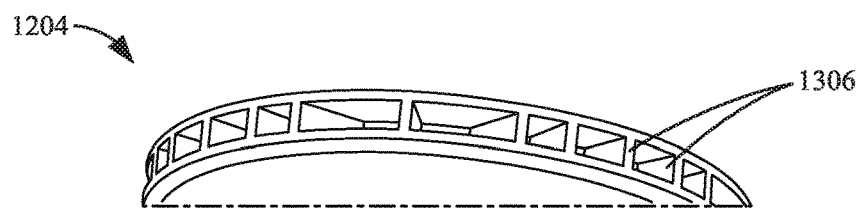
Figure 13C:
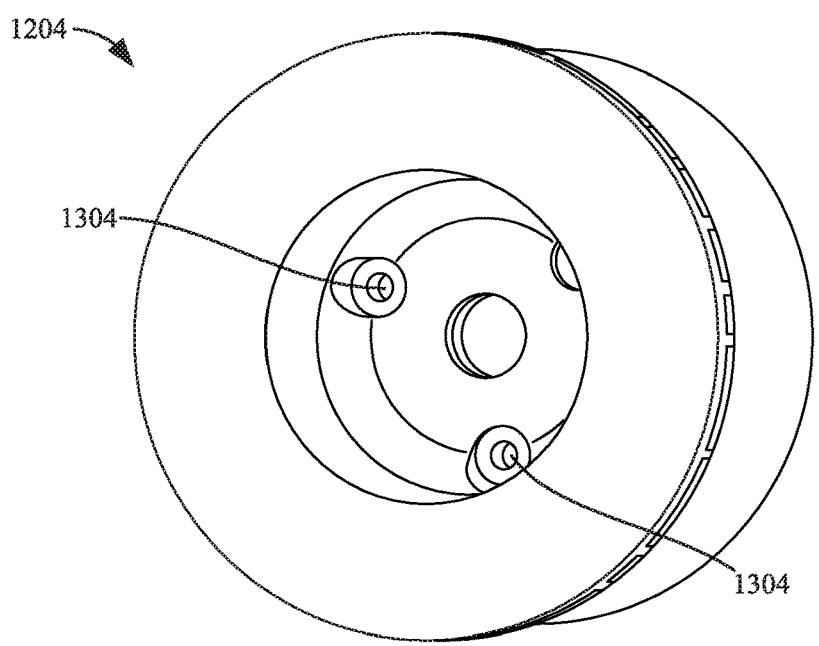

FIGS. 13A through 13C show various perspective views of the first endcap 1204. The first endcap 1204 is structured to receive the filter media 1202 and the inner cage 1208. The first endcap 1204 includes a plurality of alignment ribs 1302. The alignment ribs 1302 interact with the alignment tabs 1508 (as shown in FIG. 15B) of the inner cage 1208 as described in further detail below. The top endcap 1204 also includes a plurality of fastener openings 1304. The fastener openings 1304 are aligned with the fastener openings 1402 of the second endcap 1206. In an alternative arrangement, a plurality of first snap fit connectors are provided in place of the fastener openings 1304. The fastener openings 1304 are formed within pockets 1308. As described in further detail below with respect to FIG. 17E, the pockets 1308 receive mating projections 1404 of the second endcap 1206 when the filter element is assembled. The top endcap 1204 additionally includes an alignment ridge 1310. The alignment ridge 1310 includes three arc shaped ridges that form a broken circular shape. As described in further detail below with respect to FIG. 17E, the alignment ridge 1310 is received in alignment slots 1406 formed in the second endcap 1206. In some arrangements, the first endcap 1204 includes a plurality of vanes 1306. The vanes 1306 assist in generating a pumping effect when the filter element 1200 is rotating.

Figure 14A:
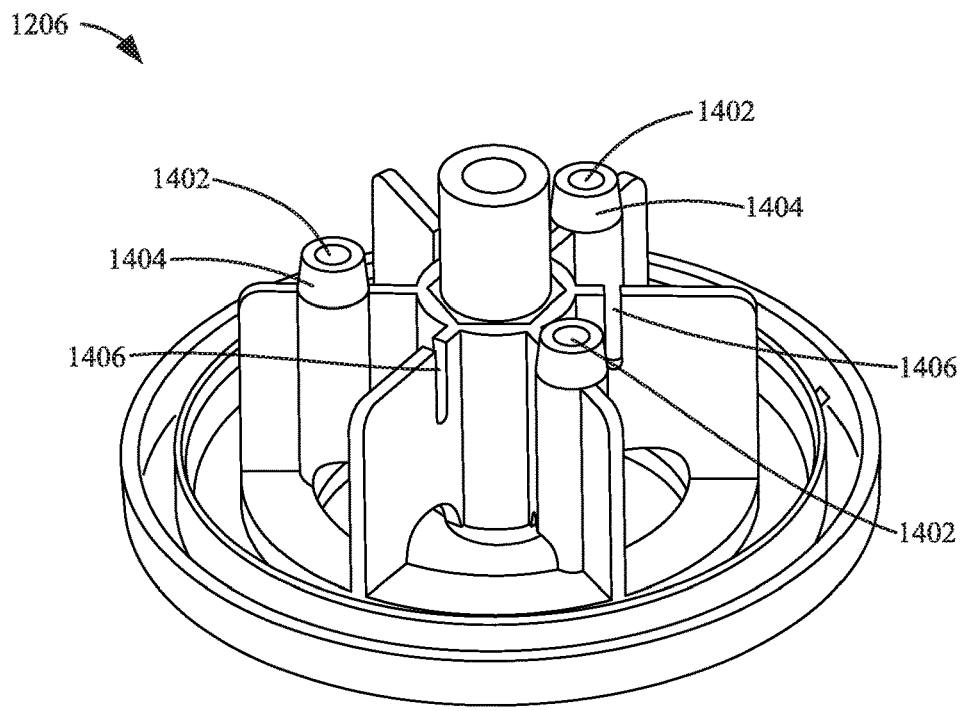
Figure 14B:
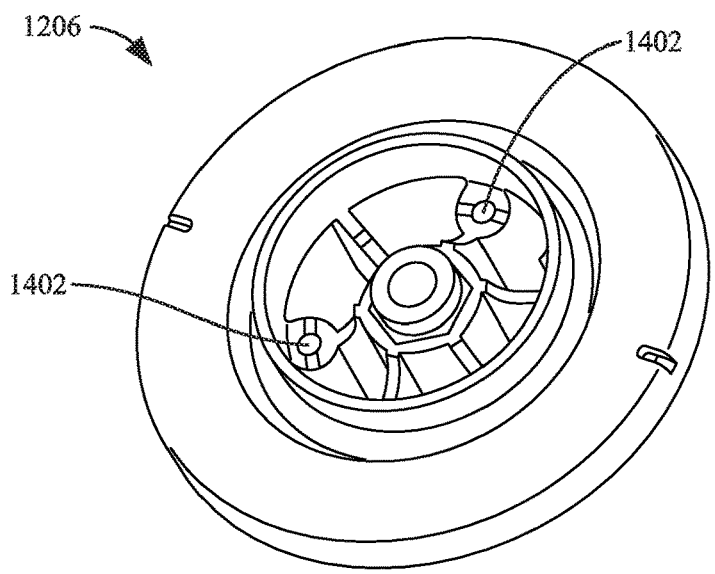

FIGS. 14A and 14B show various perspective views of the second endcap 1206. The second endcap 1206 is structured to receive the filter media 1202 and the inner cage 1208. The second endcap 1206 includes a plurality of fastener openings 1402. As described above, the fastener openings 1402 are aligned with the fastener openings 1304 of the first endcap 1204. In an alternative arrangement, a plurality of second snap fit connectors are provided in place of the fastener openings 1402. The fastener openings 1402 are formed within pockets projections 1404. As described in further detail below with respect to FIG. 17E, the projections 1404 receive mating pockets 1308 of the first endcap 1204 when the filter element is assembled. The second endcap 1206 includes a plurality of alignment slots 1406. As described in further detail below with respect to FIG. 17E, the alignment slots 1406 received the alignment ridge 1310 of the first endcap 1204.

Figure 15A:
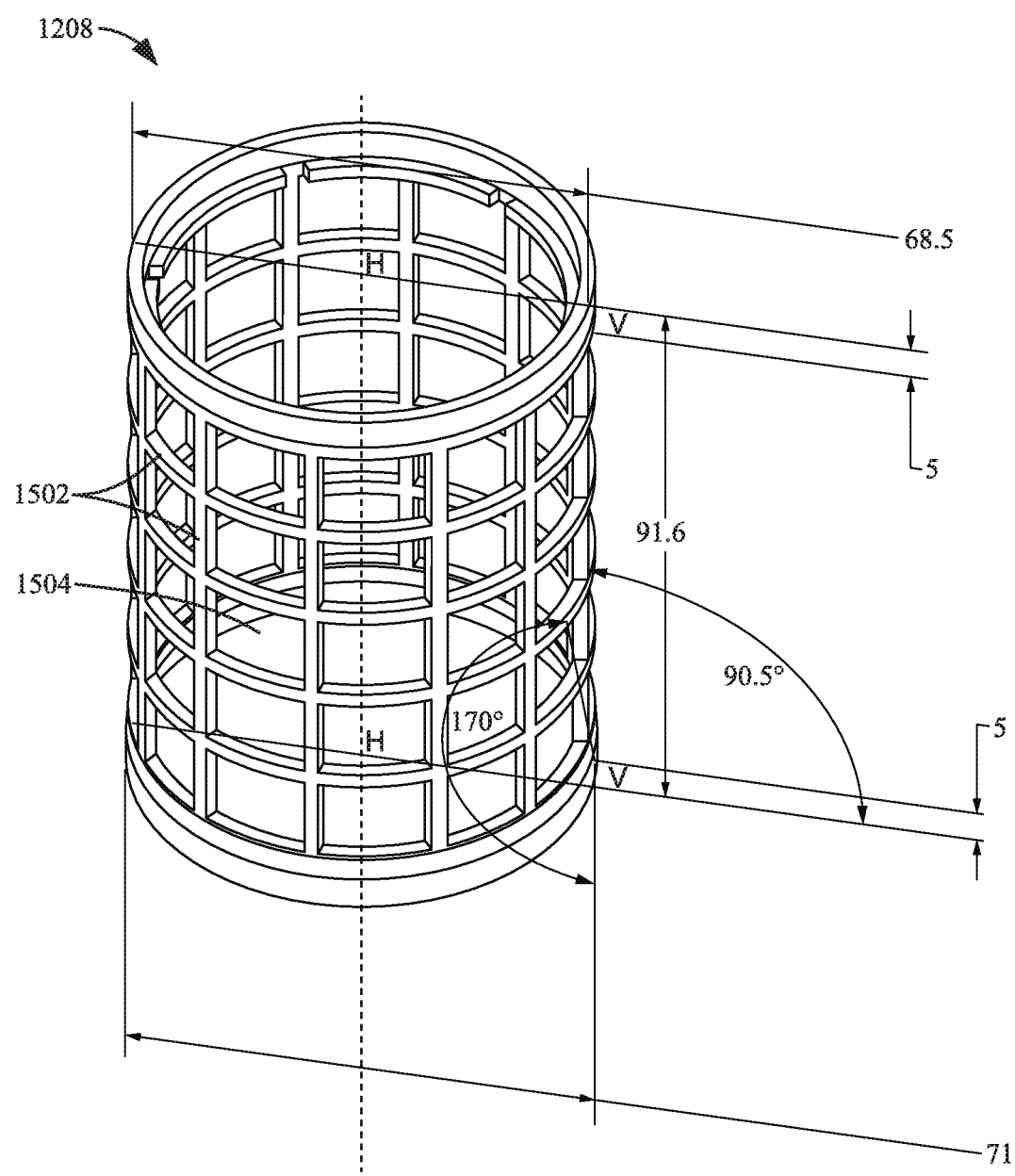
Figure 15B:
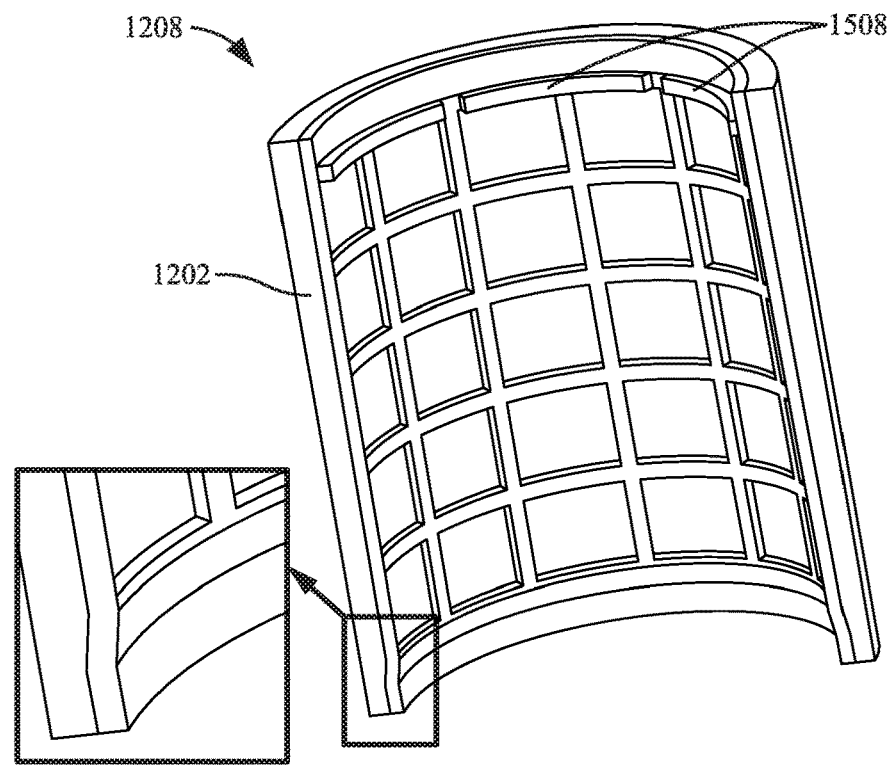
Figure 15C:
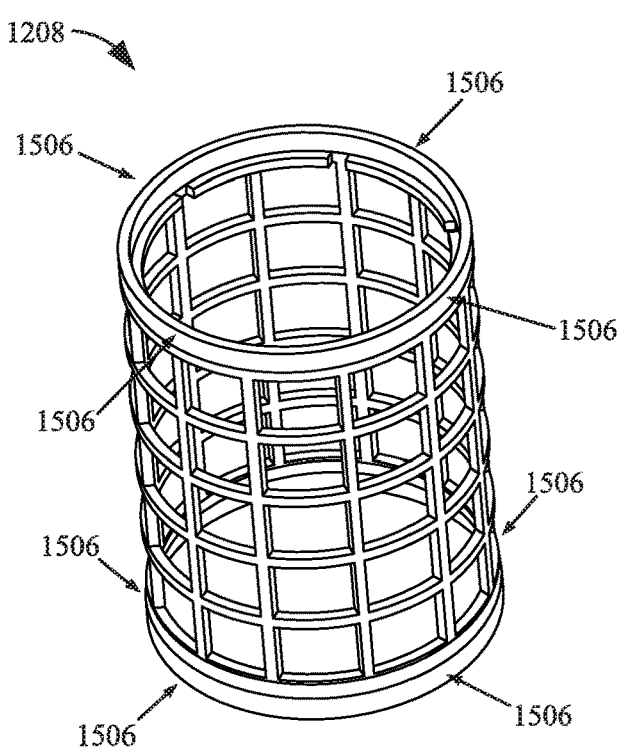

FIGS. 15A through 15C show various views of the inner cage 1208. The inner cage 1208 includes frame members 1502 that form a grid having a plurality of openings 1504. The openings 1504 permit a fluid being filtered (e.g., crankcase blowby gases) to pass through the inner cage 1208 and into the filter media 1202. The inner cage 1208 is sized and shaped to fit inside the cylindrical filter media 1202. As shown best in FIG. 15B, the inner cage 1208 has the same axial height as the filter media 1202. Additionally, the inner cage 1208 has approximately the same outer radius as the inner radius of the filter media 1202. In assembly, the filter media 1202 is inserted over the inner cage 1208. In some arrangements, the filter media 1202 is secured to the inner cage 1208 via sonic welds. In such arrangements, the inner cage 1208 includes a plurality of sonic weld spots 1506. In other arrangements, the filter media 1202 is produced in a cylindrical form having a slightly smaller inner radius than the outer radius of the inner cage 1208. In such arrangements, the filter media 1202 is stretched over the inner cage 1208, creating a friction fit between the filter media 1202 and the inner cage 1208. The inner cage 1208 additionally includes a plurality of alignment tabs 1508. The alignment tabs 1508 interact with the alignment ribs 1302 of the first endcap 1204.

Figure 16A:
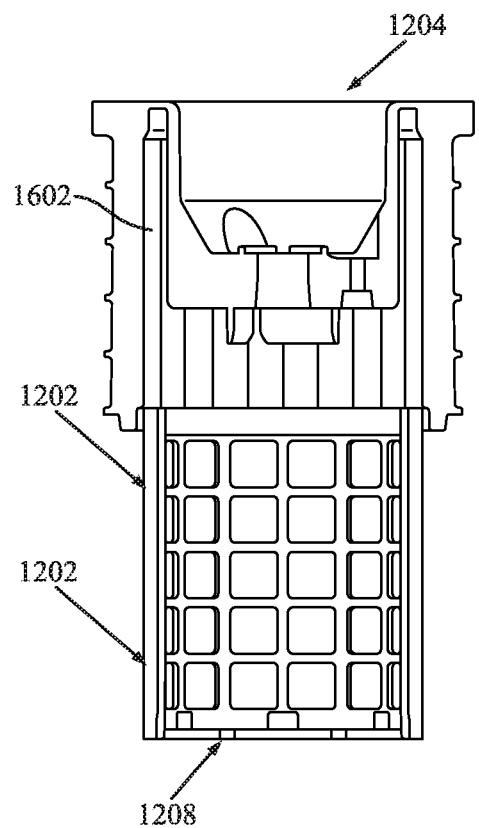
Figure 16B:
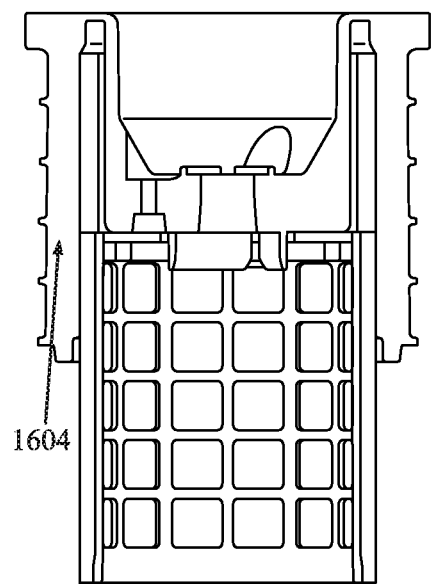
Figure 16C:
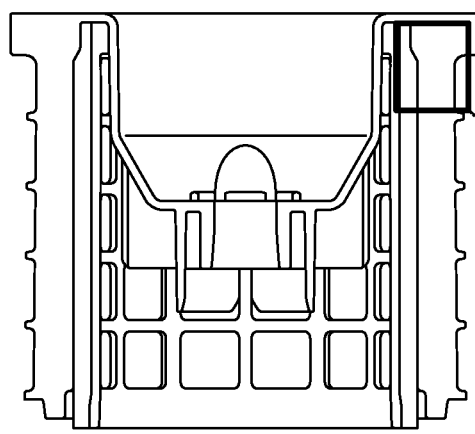
Figure 16D:
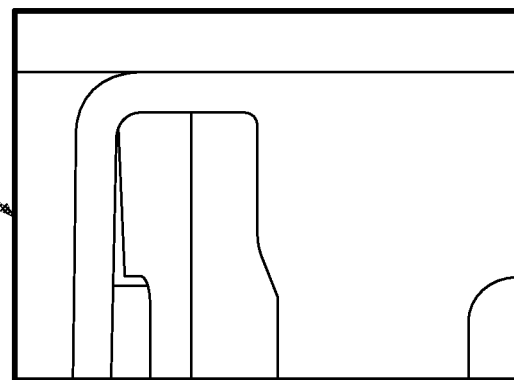

After the filter media 1202 is installed over the inner cage 1208, the filter media 1202 and the inner cage are inserted into the first endcap 1204. As shown in FIGS. 16A through 16D, the filter media 1202 and inner cage 1208 are slid into a slot 1602 formed in the first endcap 1204 along arrow 1604. FIGS. 16A through 16C are arranged in numeric order, demonstrating the installation process. As shown in FIGS. 16C and 16D, when the filter media 1202 and the inner cage 1208 are fully inserted into the first endcap, the filter media 1202 gets radially pinched within the slot 1602 by the first endcap 1204 and the inner cage 1208 thereby creating a seal between the filter media 1202 and the first endcap 1204. The seal is formed without the use of additional sealing material (e.g., adhesive, potting material, etc.). A close-up view of the radial pinch is shown in FIG. 16D. As shown in FIG. 16E, the alignment tabs 1508 of the inner cage 1208 interact with the alignment ribs 1302 of the first endcap 1204 to align the inner cage 1208 with the first endcap 1204. As shown in FIG. 16F, the slot 1602 includes a tapered surface 1604 that narrows the width of the slot. The tapered surface 1604 forms a media lead in surface that causes the media 1202 to be radially pinched (e.g., as shown in FIG. 16G). In some arrangements, the slot 1602 is structured to receive a potting material such that the first endcap 1204 can also be used in filter elements using potting material to form a seal between filter media 1202 and the first endcap 1204. In alternate arrangements, other sealing methods are used to form a seal between the filter media 1202 and the first endcap 1204, such as the use of a gasket, the use of an o-ring, the use of a spongey material, or the like.

Figure 17A:
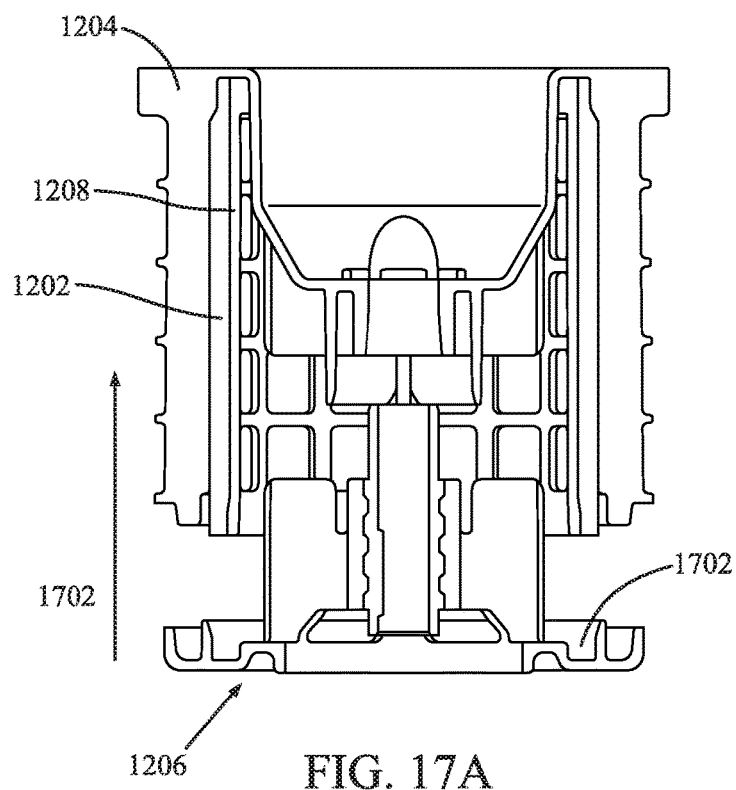
Figure 17B:
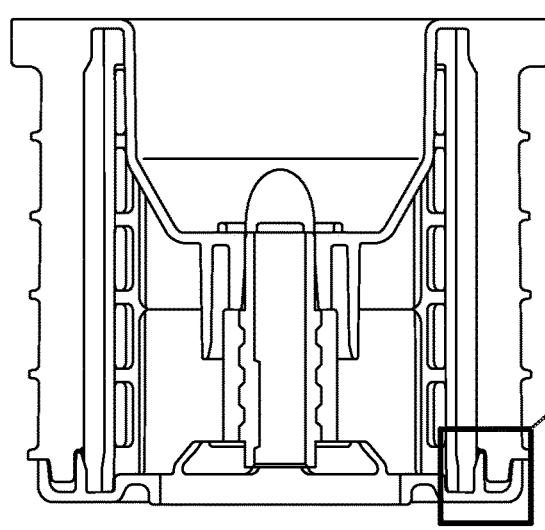
Figure 17C:
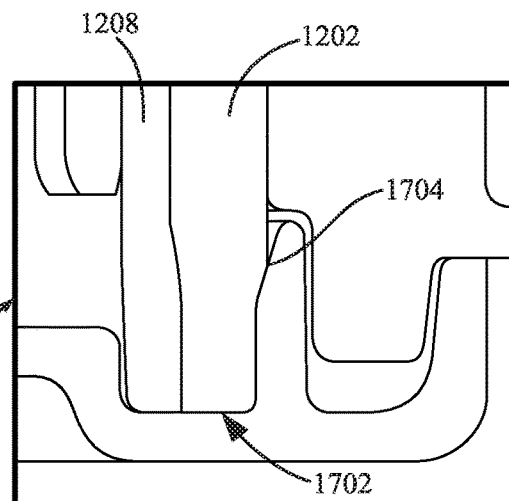
Figure 17D:
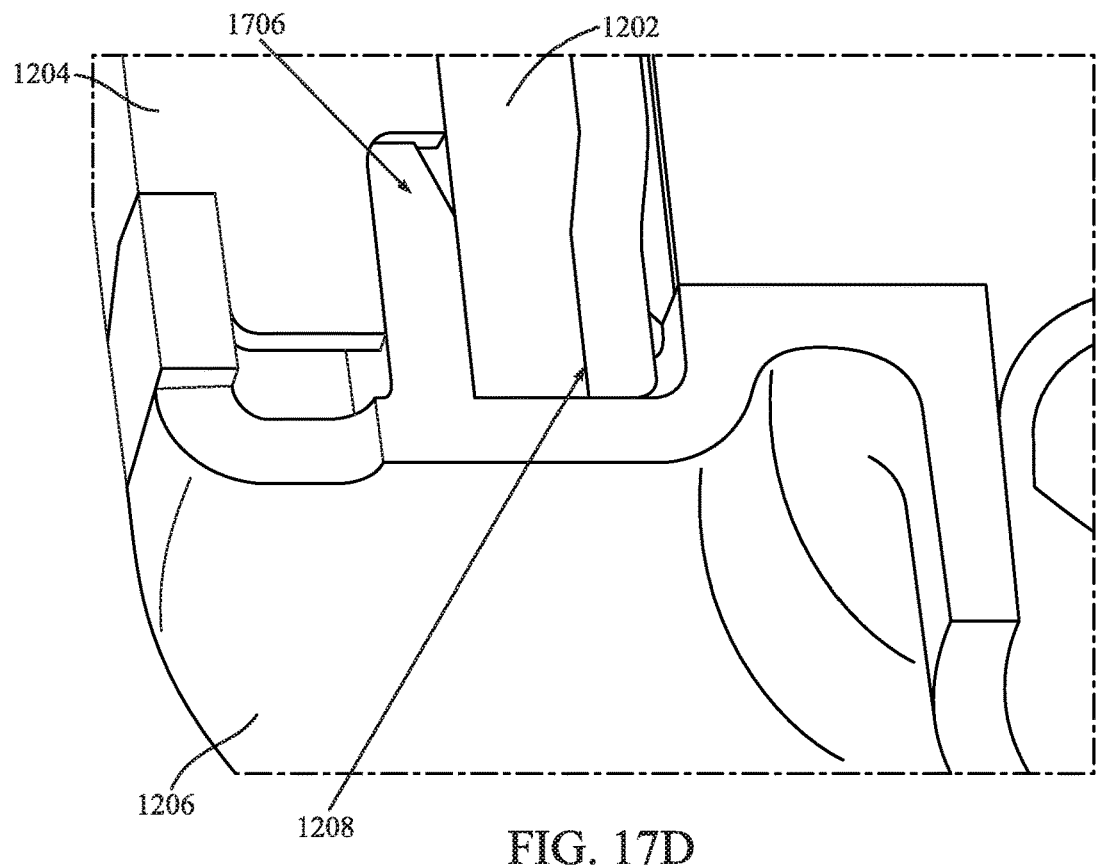

After the filter media 1202 and the inner cage 1208 are installed into the first endcap 1204, the second endcap 1206 is installed. As shown in FIGS. 17A through 17C, the second endcap 1206 is slid over the filter media 1202 and the inner cage 1208 in the direction of arrow 1702 until the second endcap 1206 abuts the first endcap 1204. FIGS. 17A through 17C are arranged in numeric order demonstrating the installation process. When the second endcap 1206 is in the fully installed position (as shown in FIGS. 17B and 17C), the filter media 1202 is radially pinched between the inner cage 1208 and the second endcap 1206 to form a seal between the filter media 1202 and the second endcap 1206. The seal is formed without the use of additional sealing material (e.g., adhesive, potting material, etc.). As shown best in FIGS. 17C and 17D, the second endplate 1206 includes a channel 1702 that receives the filter media 1202 and the inner cage 1208. The channel 1702 includes a tapered surface 1704. The tapered surface 1704 reduces the width of the base of the channel to a width that is narrower than the uncompressed filter media 1202 and inner cage 1208. As shown in FIG. 17D, the outline 1706 is the expected shape of the uncompressed filter media 1202. However, when the channel 1702 receives the filter media 1202 and the inner cage 1208, the filter media 1202 is compressed to form the seal. In some arrangements, the filter media 1202 and the inner cage 1208 are installed into the second endcap 1206 prior to the first endcap 1204 (i.e., the manufacturing process of the filter element 1200 performs the steps of FIGS. 17A through 17E prior to the steps shown in FIGS. 16A through 16G).

Figure 17E:
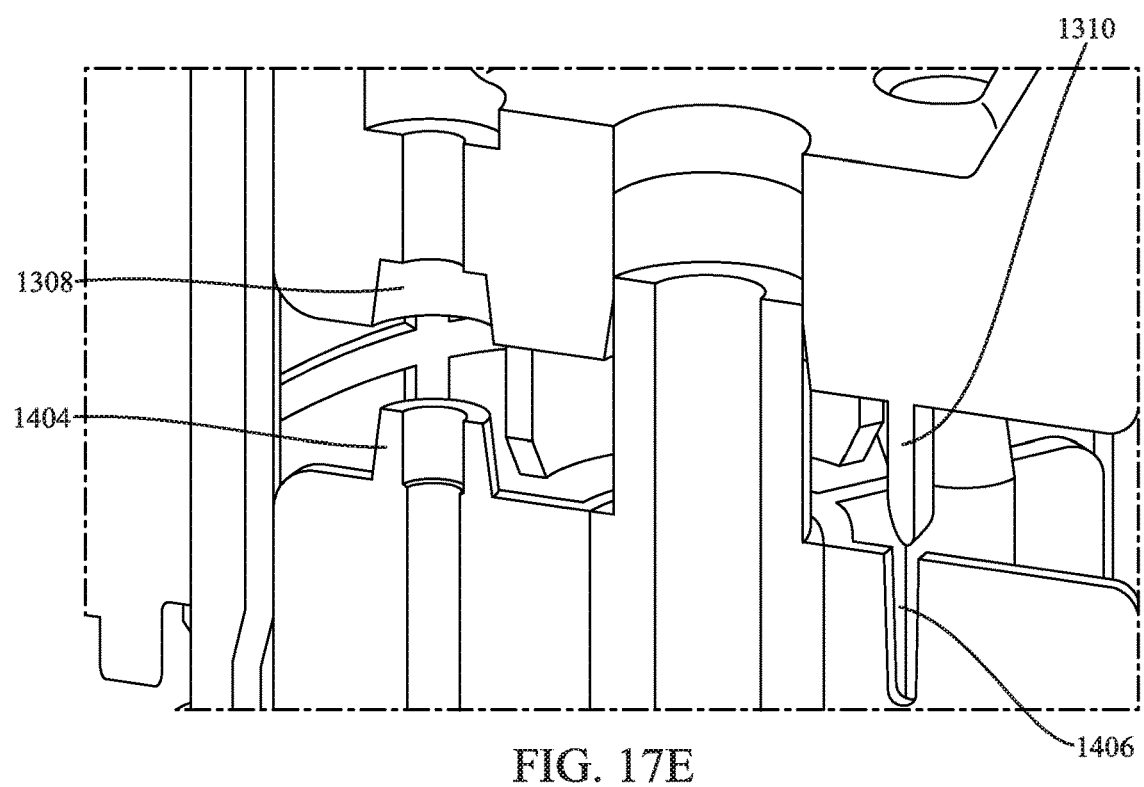

As shown in FIG. 17E, the first endcap 1204 and the second endcap 1206 include mating alignment mechanisms that ensure proper alignment of the first endcap 1204 with respect to the second endcap 1206 during installation. During installation, the projections 1404 of the second endcap 1206 are received within the pockets 1308 of the first endcap 1204. Additionally, the alignment ridge 1310 of the first endcap 1204 is received within the slots 1406 of the second endcap 1206. The above-noted alignment mechanisms ensures that the first endcap 1204 and the second endcap 1206 can only be aligned in a correct manner. Accordingly, the alignment mechanisms prevent improper assembly of the filter element 1200.

Figure 18A:
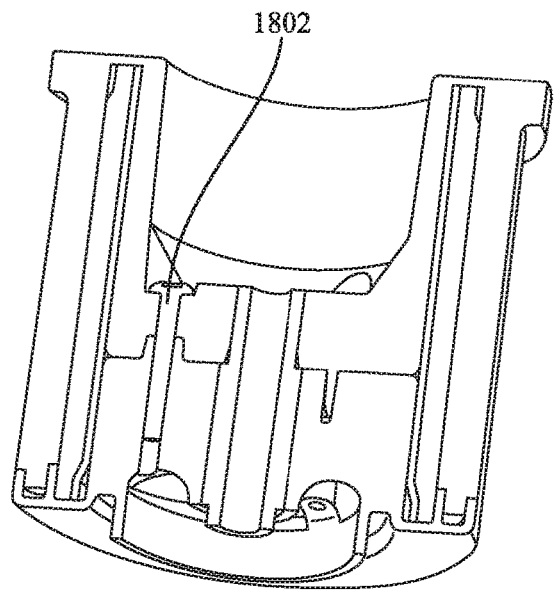
Figure 18B:
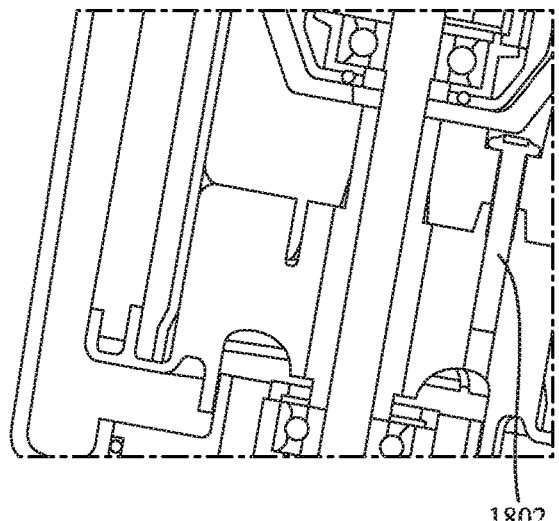
Figure 18C:
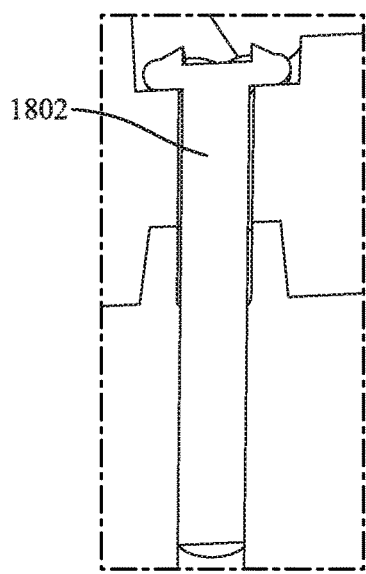
Figure 18D:
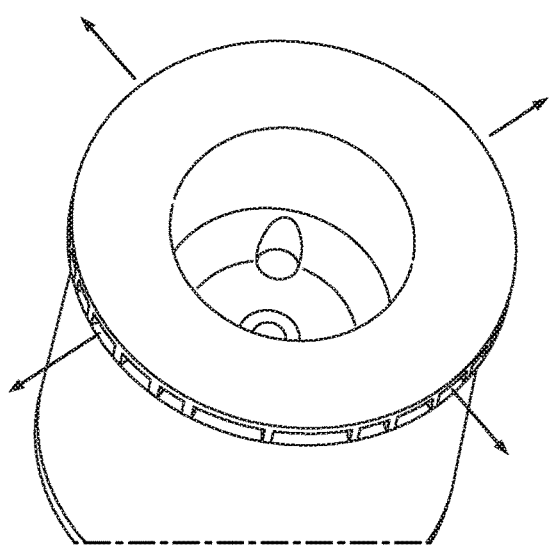

After the first endcap 1204 and the second endcap 1206 are pressed together, a fastener 1802 is inserted to secure the first endcap 1204 and the second endcap 1206 to each other. As shown in FIGS. 18A through 18D, the fastener 1802 may be a threaded bolt or screw (e.g., a thread forming screw, a standard screw, etc.). The fastener 1802 is inserted into the fastener openings 1304 and 1402. In some arrangements, the fastener opening 1304 has a greater width than the fastener 1802 (e.g., as shown in FIG. 18C) allowing the fastener to be partially inserted prior to being threaded into the fastener opening 1402. When fully installed, the fasteners 1802 are positioned near the center of gravity of the filter element 1200. In an alternative arrangement, a snap-fit connection is used between the first endcap 1204 and the second endcap 1206. In yet a further arrangement, an adhesive (e.g., a potting material) is used to secure the assembly of filter media 1202 and the inner cage 1208 to the first endcap 1204 and to the second endcap 1206.

Figure 19:
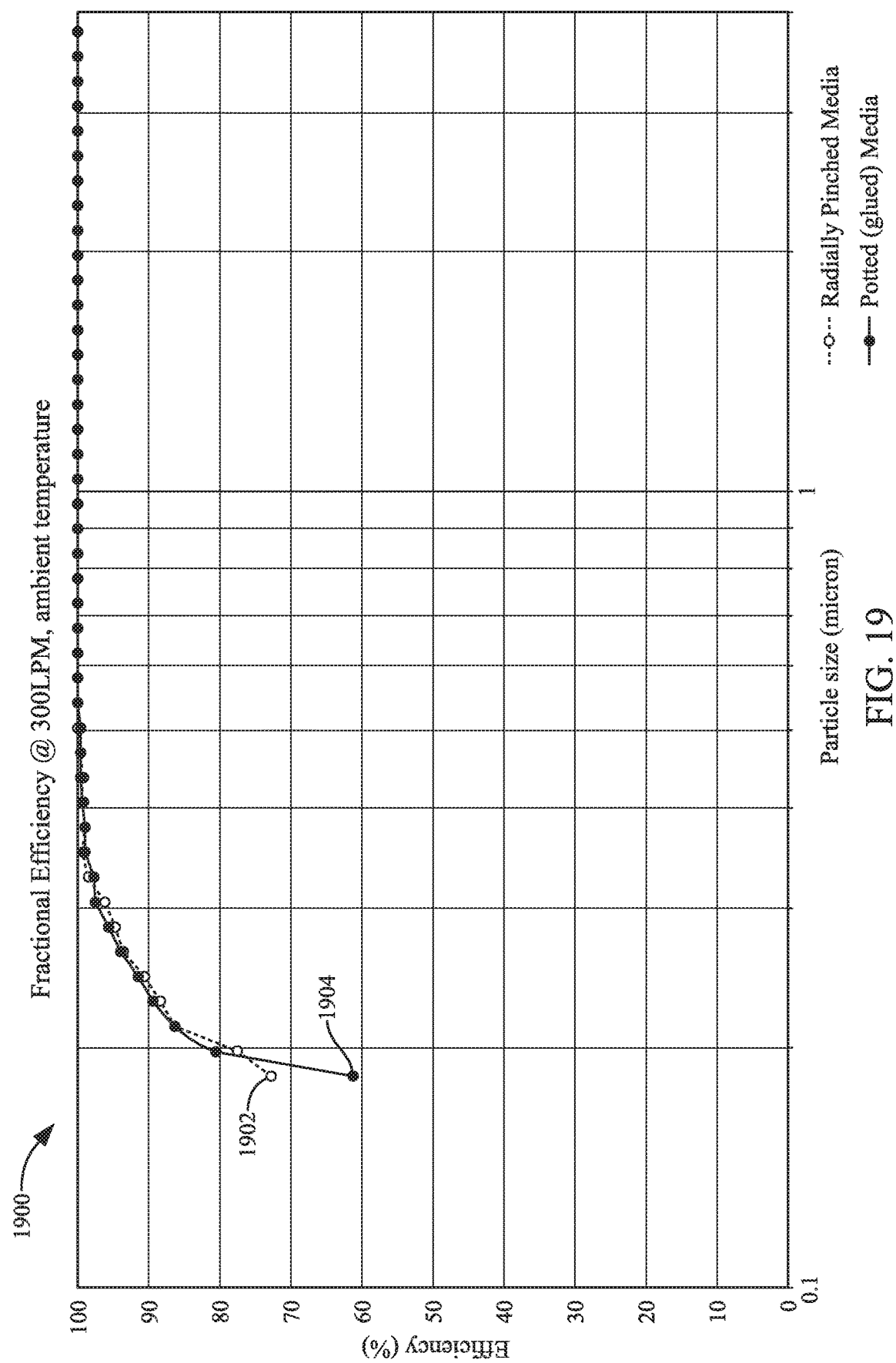
FIG. 19 shows a graph plotting the fractional efficiency of radially pinched media and potted media versus particle size.

Referring to FIG. 19, a graph 1900 plotting the fractional efficiency of radially pinched media 1902 (e.g., as done in filter element 1200) and potted (glued) media 1904 versus particle size is shown. As shown in graph 1900 the radially pinched media performs substantially the same as the potted media.

Figure 20:
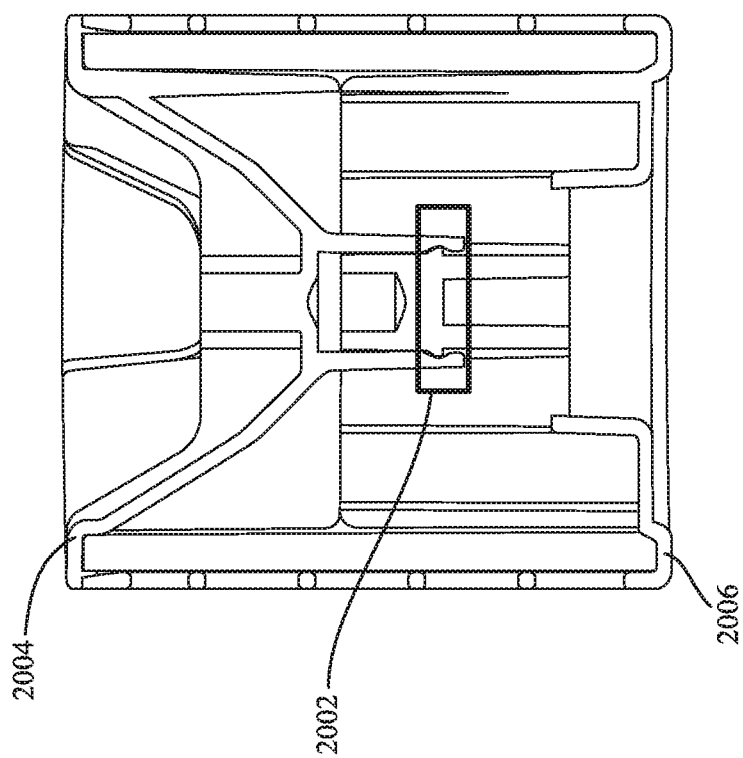
FIGS. 20 through 24B show views of various connections that secure a first endcap to a second endcap of a filter cartridge.
Figure 21B:
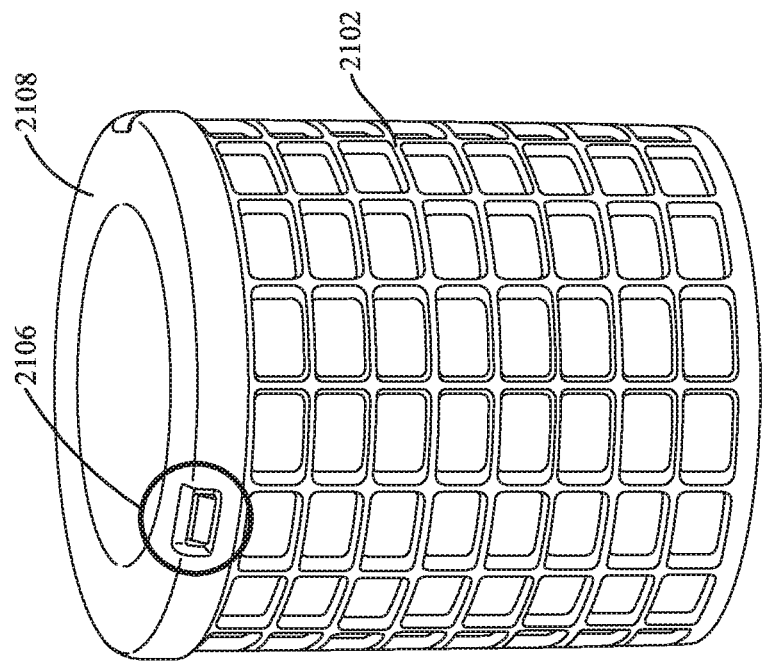
Figure 21A:
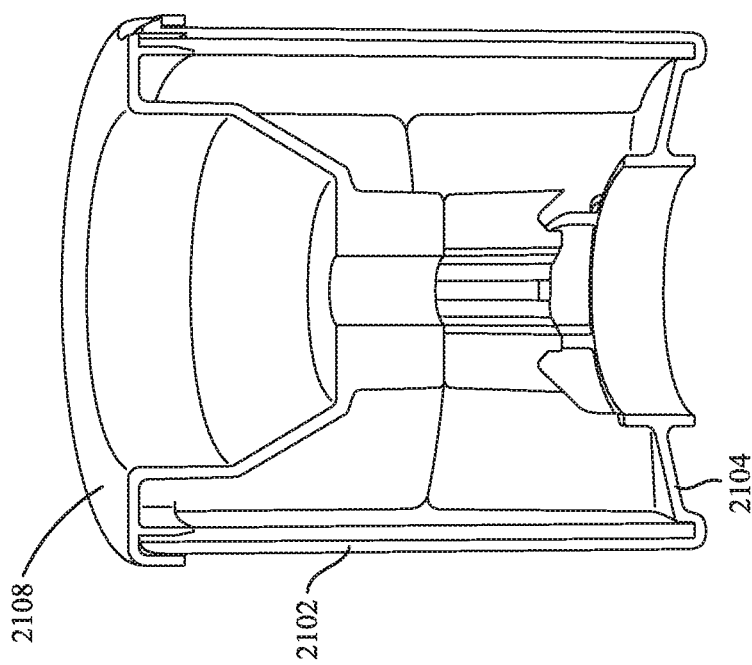
Figure 22B:
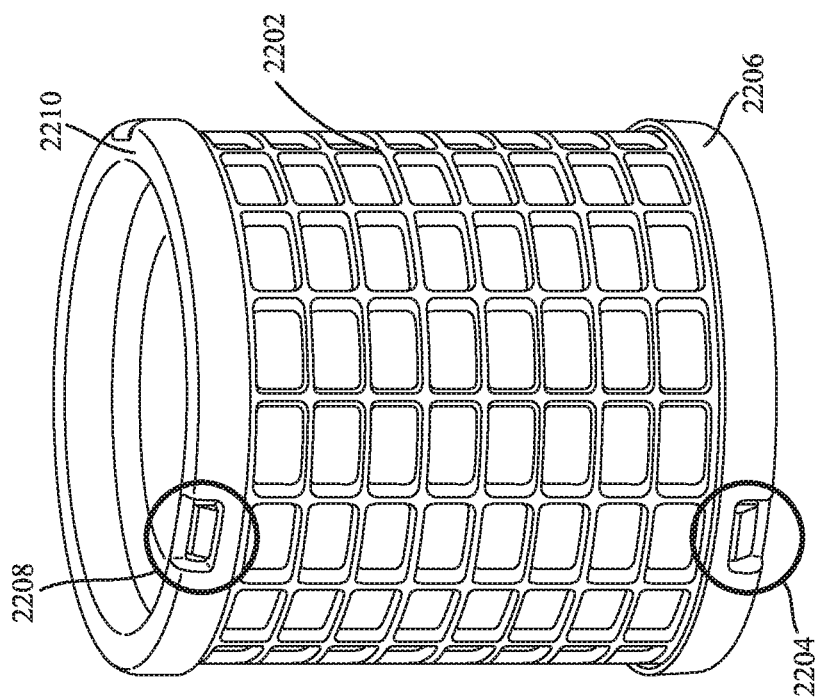
Figure 22A:
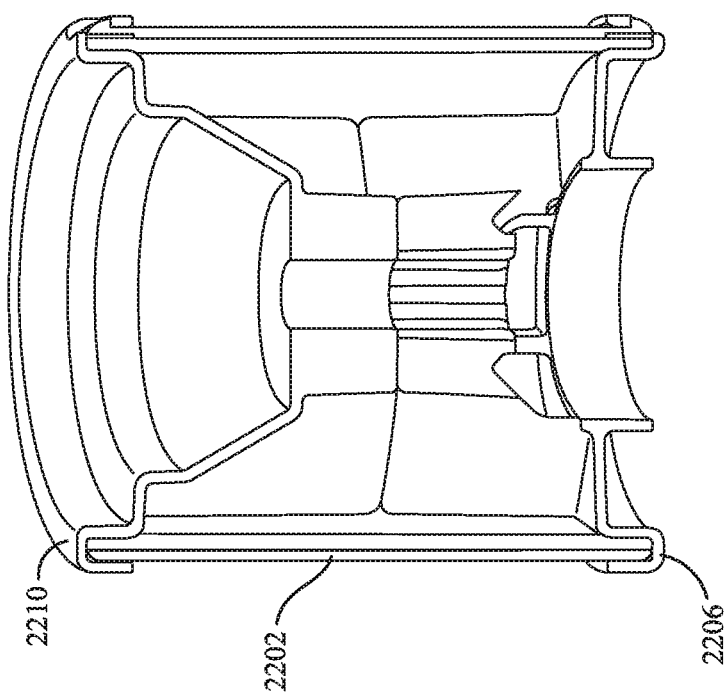
Figure 23B:
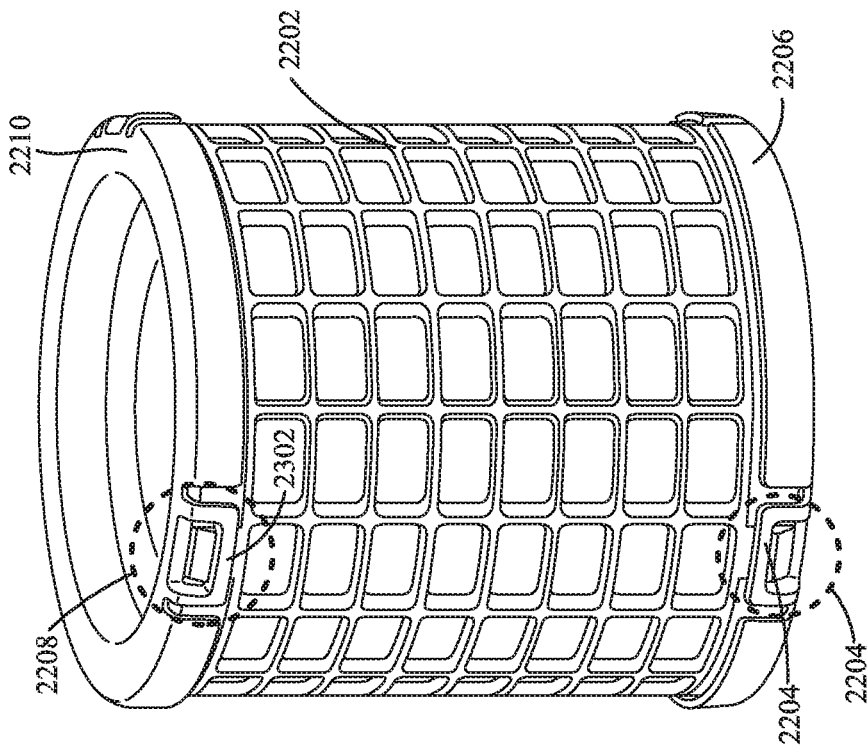
Figure 23A:
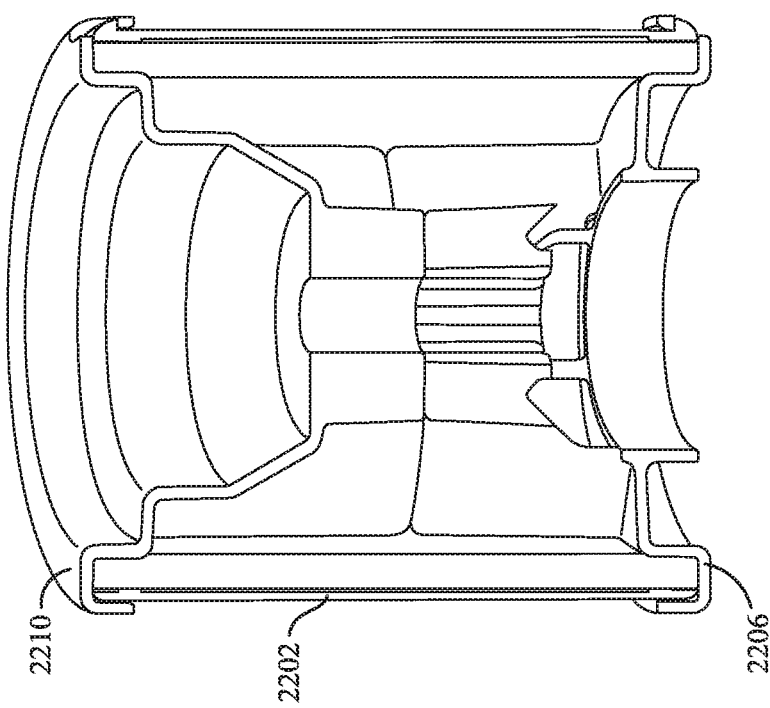
Figure 24B:
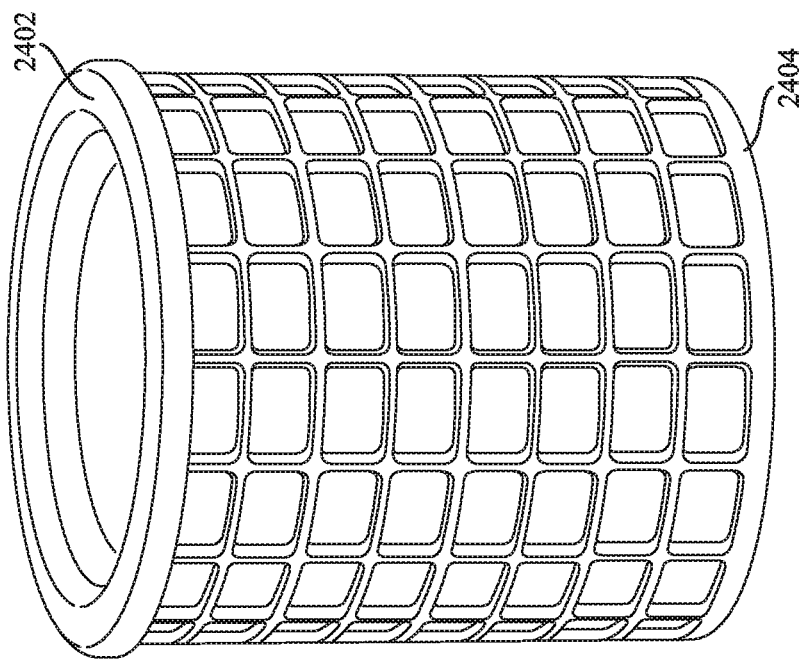
Figure 24A:
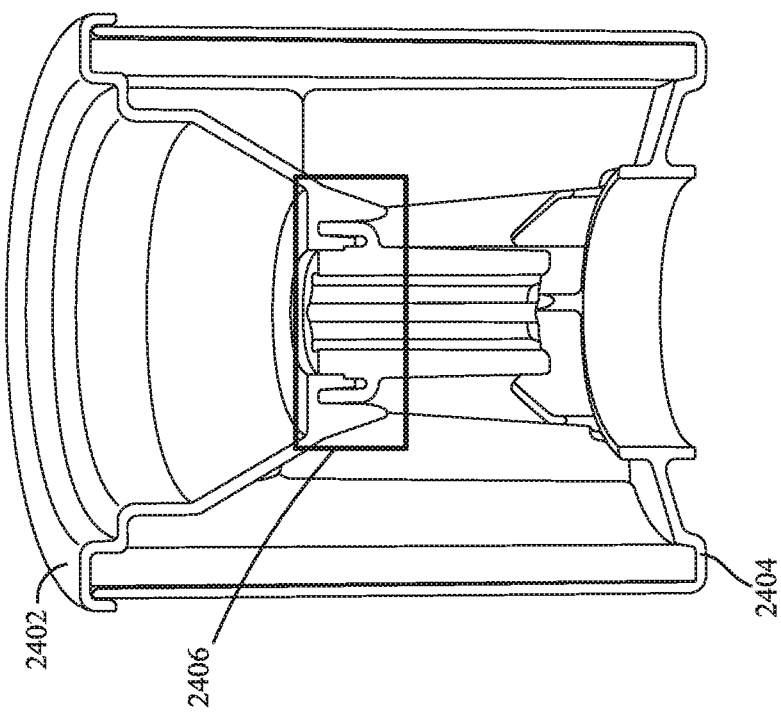

Referring to FIGS. 20 through 24B, views of various connections that secure the first and second endcaps of the filter cartridge to each other are shown. As shown in FIG. 20, a snap-fit connection is used at an inner portion (shown at 2002) of the filter cartridge to secure the first endcap 2004 and second endcap 2006 together. As shown in FIGS. 21A and 21B, a cage or solid shell 2102 that is an integral part of a first endcap 2104 forms a snap-fit connection (shown at 2106) with a second endcap 2108. As shown in FIGS. 22A and 22B, a cage or solid shell 2202 forms two snap-fit connections: a first snap-fit connection (shown at 2204) between the cage or solid shell 2202 and a first endcap 2206, and a second snap-fit connection (shown at 2208) between the cage or solid shell 2202 and a second endcap 2210. Referring to FIGS. 23A and 23B, a similar snap-fit connection arrangement is shown as in FIGS. 22A and 22B; accordingly like numbering is used between the two sets of figures. The difference between the arrangement of FIGS. 22A and 22B and the arrangement of FIGS. 23A and 23B is that the first and second endcaps 2206 and 2210 of FIGS. 23A and 23B additionally include flexing snap features 2302 that snap over barbs located on the cage or solid shell 2202. As shown in FIGS. 24A and 24B, a plastic weld (e.g., a sonic weld) is used to secure a first endcap 2402 to a second endcap 2404. The plastic weld is positioned between mating surfaces of the first and second endcaps 2402 and 2404 at an inner portion of the filter cartridge (shown at 2406).

Figure 25B:
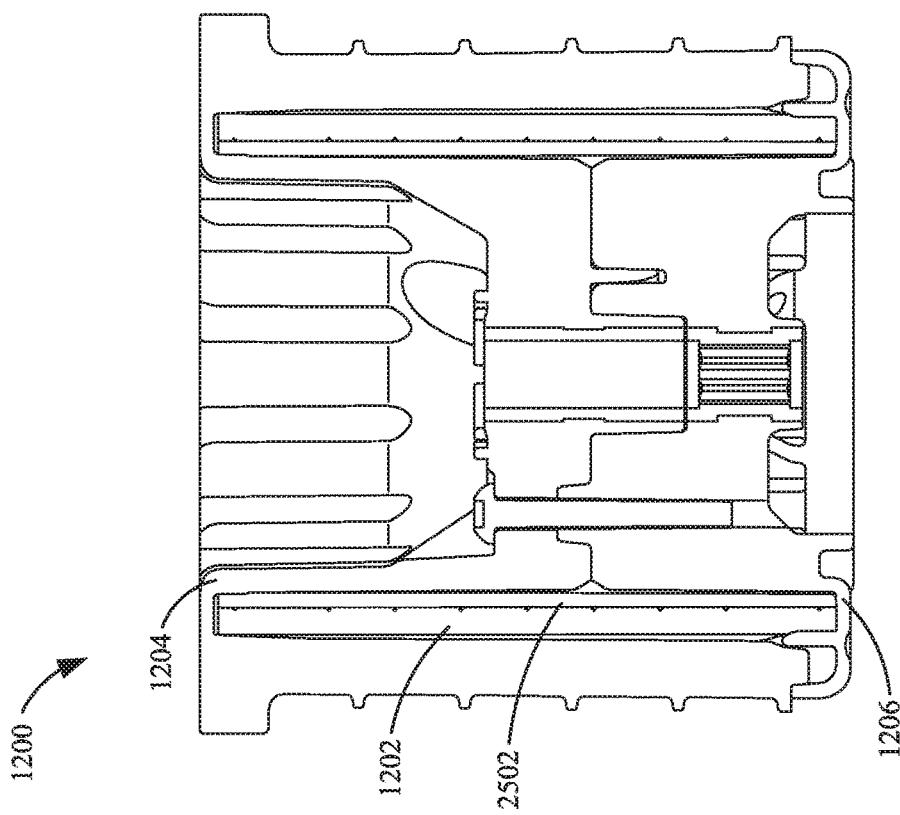
FIGS. 25A, 25B, and 25C each show a different cross-sectional view of a rotating filter cartridge according to an example embodiment.
Figure 25A:
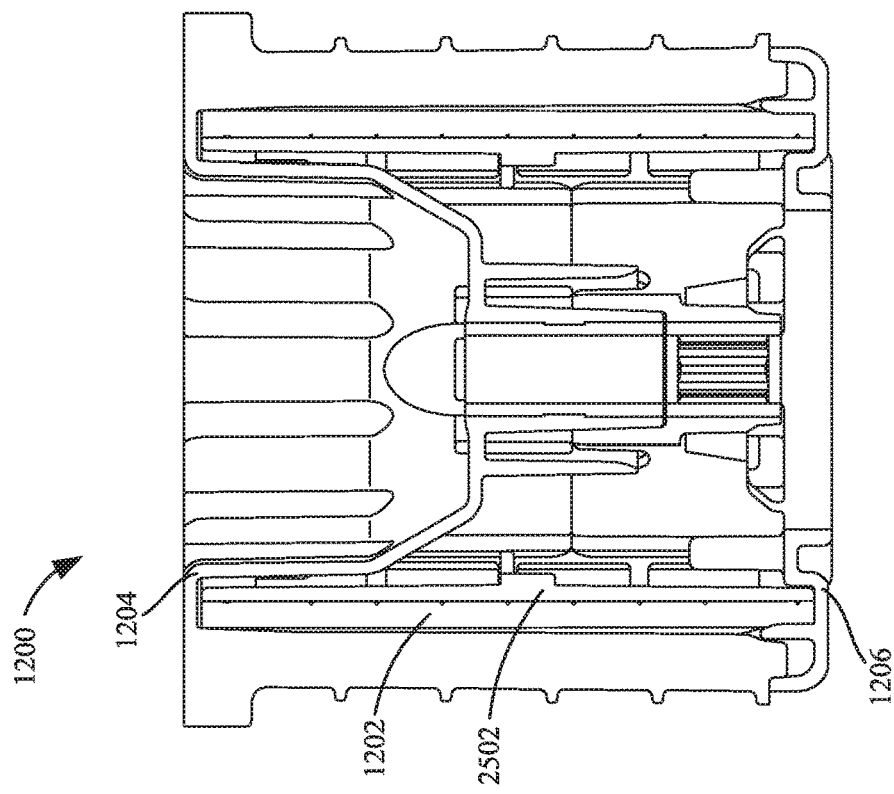
Figure 25D:
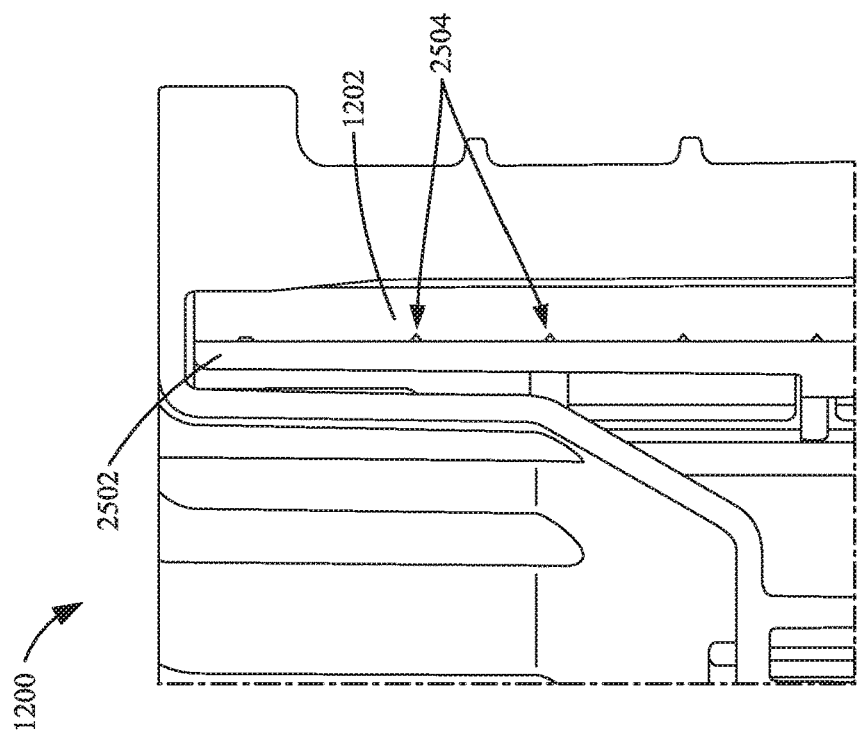
FIG. 25D shows a close-up cross-sectional view of the rotating filter cartridge of FIG. 25A.
Figure 25C:
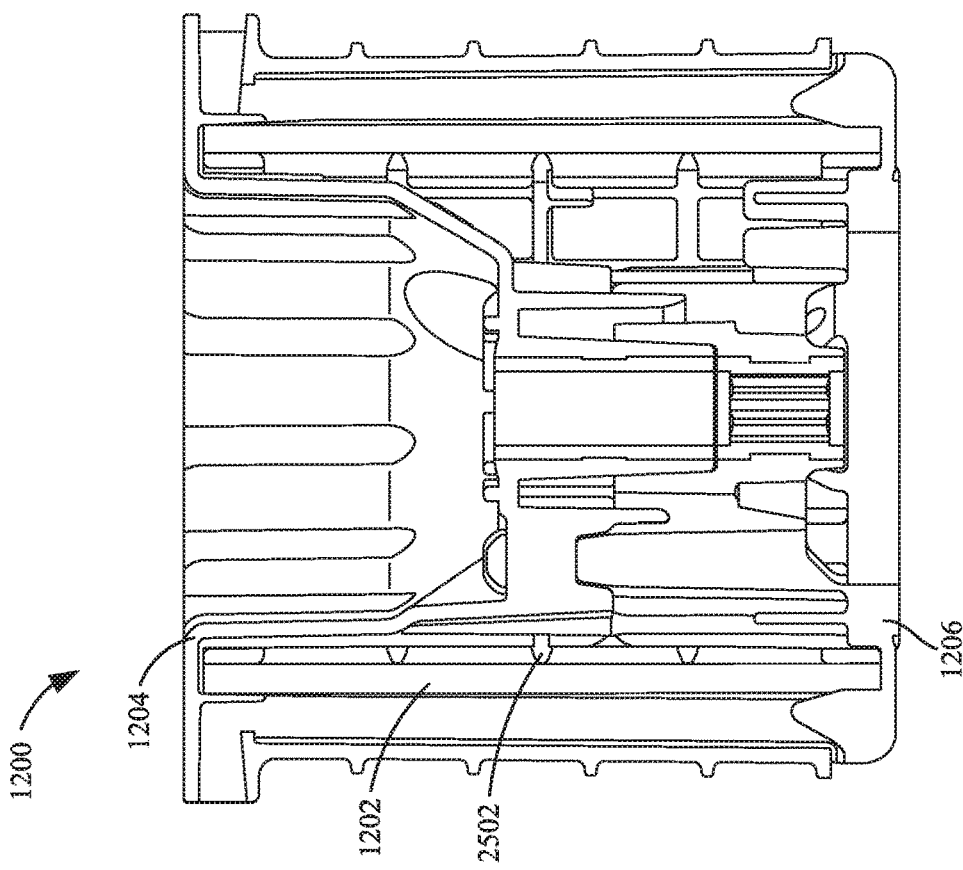
Figure 25E:
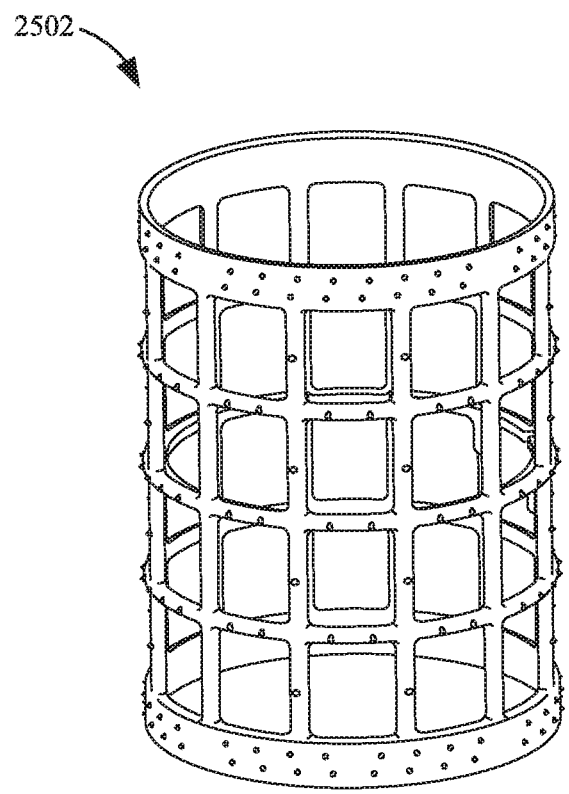
FIGS. 25E and 25F each show a different perspective view of an inner cage of the rotating filter cartridge of FIG. 25A.
Figure 25F:
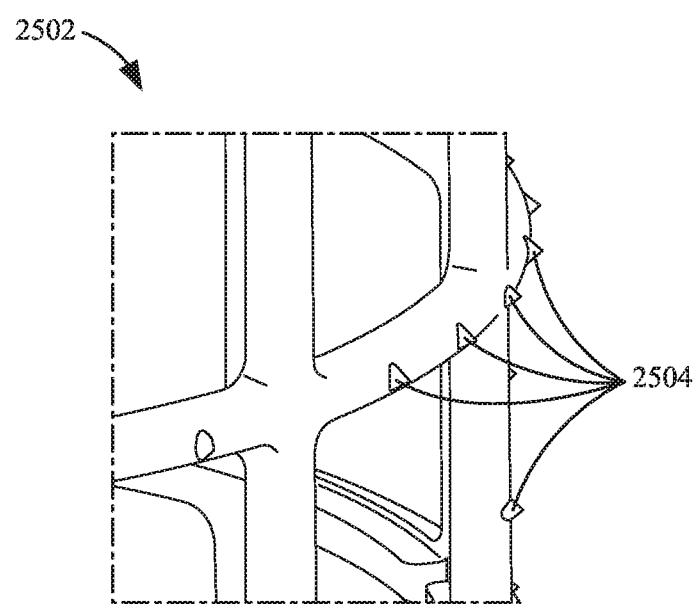

Referring to FIGS. 25A through 25F, various views of a rotating filter cartridge 2500 and components of the filter cartridge 2500 are shown according to an example embodiment. FIGS. 25A, 25B, and 25C each show a different cross-sectional view of the filter cartridge 2500. FIG. 25D shows a close-up cross-sectional view of the filter cartridge 2500 showing the spikes 2504 of the inner cage 2502 interacting with the filter media 1202. FIG. 25E shows a perspective view of the inner cage 2502 of the filter cartridge 2500. FIG. 25F shows a close-up perspective view of the spikes 2504 arranged on the inner cage 2502. The filter cartridge 2500 is similar to the filter cartridge 1200. Accordingly, like numbering is used to designate like components between the filter cartridge 2500 and the filter cartridge 1200. The primary difference between the filter cartridge 2500 and the filter cartridge 1200 is that the filter cartridge 2500 includes an inner cage 2502 having a plurality of projections (spikes 2504) that grip the filter media 1202, whereas the inner cage 1208 of the filter cartridge 1200 does not include the plurality of spikes. As shown best in FIGS. 25E and 25F, the spikes 1504 are arranged on an outer surface of the inner cage 1502. In the arrangement of FIGS. 25A through 25F, the spikes 1504 are conical in shape. In other arrangements, the spikes 1504 can be arranged in other shapes, such as cylinders, pyramids, a cylinder having a rounded or conical outer surface, or the like. During and after assembly of the filter cartridge 2500, the spikes 2504 are pressed into the filter media 1202 such that the spikes 2504 extend into the filter media 1202 and hold the filter media 1202 in place against the inner cage 2502.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems and method steps described herein may be used alone or in combination with other configurations, systems and method steps. It is to be expected that various equivalents, alternatives and modifications are possible.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments, and elements from different embodiments may be combined in a manner understood to one of ordinary skill in the art. Other substitutions, modifications, changes and omissions may also be made in the design, operating conditions and arrangement of the various example embodiments without departing from the scope of the present invention.

What is claimed is:

1. A rotating filter cartridge comprising:
    a first endcap defining an inner circumferential lip and an outer circumferential lip;
    a second endcap;
    a body secured to the first endcap and the second endcap and engaged with one of the inner circumferential lip or the outer circumferential lip; and
    filter media positioned between the first endcap and the second endcap, the filter media creating a mechanical seal between (i) at least one of the first endcap or the second endcap, and (ii) the filter media during rotation of the rotating filter cartridge without the use of a potting material, wherein one of the inner circumferential lip or the outer circumferential lip, and the body, forms a pocket that radially pinches the filter media to form the mechanical seal.

2. The rotating filter cartridge of claim 1, wherein the mechanical seal is formed at least in part by a centrifugal force caused by the rotation of the rotating filter cartridge pressing the filter media against the outer circumferential lip of the first endcap.

3. The rotating filter cartridge of claim 2, wherein the mechanical seal is formed at least in part by a centrifugal force caused by the rotation of the rotating filter cartridge pressing the filter media against an outer circumferential lip of the second endcap.

4. The rotating filter cartridge of claim 1, further comprising a gasket positioned between the filter media and either the outer circumferential lip of the first endcap or an outer circumferential lip of the second endcap, wherein the mechanical seal is formed by a centrifugal force caused by the rotation of the rotating filter cartridge pressing the filter media against the gasket.

5. The rotating filter cartridge of claim 1, wherein at least one of the first endcap or the second endcap includes a first projection that penetrates into the filter media to secure the positioning of the filter media with respect to the first endcap or the second endcap.

6. The rotating filter cartridge of claim 5, wherein the first projection is a continuous spiral rib.

7. The rotating filter cartridge of claim 1, wherein the pocket has a pocket width that is narrower than a width of the filter media, the filter media inserted into the pocket such that the pocket radially pinches or traps the filter media in the pocket at an inner circumference of the filter media or an outer circumference of the filter media thereby forming the mechanical seal.

8. The rotating filter cartridge of claim 1, wherein the mechanical seal is formed by a sponge material overmolded onto the first endcap or the second endcap and positioned between the first endcap or the second endcap and the filter media.

9. The rotating filter cartridge of claim 1, wherein the rotating filter cartridge is a crankcase coalescer.

10. The rotating filter cartridge of claim 1, wherein at least one of the first endcap and the second endcap are secured to the body with a fastener, a snap fit connection, or a weld.

11. The rotating filter cartridge of claim 1, wherein the filter media is welded to the body.

12. The rotating filter cartridge of claim 1, wherein the body further comprises an inner cage having an inner surface and an outer surface, the outer surface of the inner cage adjacent to and supporting the filter media.

13. The rotating filter cartridge of claim 12, wherein the outer surface of the inner cage comprises a plurality of projections extending into the filter media.

14. The rotating filter cartridge of claim 1, wherein the body comprises an outer body that is engaged with an outer radial surface of the filter media.

15. The rotating filter cartridge of claim 1, wherein together the inner circumferential lip and the outer circumferential lip define a channel, at least one of the inner circumferential lip or the outer circumferential lip including a tapered surface that reduces the width of the channel to a width that is narrower than a combination of the widths of the uncompressed filter media and the body.

16. The rotating filter cartridge of claim 1, wherein the first endcap is secured to the second endcap via a snap fit connection.

17. The rotating filter cartridge of claim 1, wherein the first endcap and the second endcap include mating alignment mechanisms so as to ensure proper rotational alignment of the first endcap with respect to the second endcap during installation.

18. The rotating filter cartridge of claim 1, wherein the first endcap comprises a plurality of first fastener openings formed within a plurality of pockets, and the second endcap comprises a plurality of second fastener openings formed within pocket projections that are receivable within the plurality of pockets.

19. The rotating filter cartridge of claim 1, wherein the body includes a plurality of alignment tabs, and wherein the first endcap includes a plurality of alignment ribs engaged with and extending radially away from the inner circumferential lip or the outer circumferential lip, the plurality of alignment ribs engageable with the plurality of alignment tabs so as to prevent relative rotation between the first endcap and the body.

20. The rotating filter cartridge of claim 1, wherein the first endcap includes a plurality of vanes extending radially therethrough and forming at least one opening on an outer perimeter surface of the first endcap.

* * * * *